(12) United States Patent
Nonoyama et al.

(10) Patent No.: US 11,180,108 B2
(45) Date of Patent: Nov. 23, 2021

(54) PREPARATORY FOLDED FORM OF AN AIRBAG

(71) Applicant: TOYODA GOSEI CO., LTD., Kiyosu (JP)

(72) Inventors: Yuki Nonoyama, Kiyosu (JP); Takanori Komatsu, Kiyosu (JP); Masashi Hotta, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 16/823,488

(22) Filed: Mar. 19, 2020

(65) Prior Publication Data
US 2020/0307498 A1 Oct. 1, 2020

(30) Foreign Application Priority Data

Mar. 28, 2019 (JP) .............................. JP2019-063644
Feb. 12, 2020 (JP) .............................. JP2020-021699

(51) Int. Cl.
*B60R 21/237* (2006.01)
*B60R 21/203* (2006.01)

(52) U.S. Cl.
CPC .......... *B60R 21/237* (2013.01); *B60R 21/203* (2013.01)

(58) Field of Classification Search
CPC ........................... B60R 21/203; B60R 21/237
USPC .......................................................... 280/731
See application file for complete search history.

(56) References Cited

U.S. PATENT DOCUMENTS

| 10,507,781 | B2* | 12/2019 | Nakanishi | B60R 21/233 |
|---|---|---|---|---|
| 2017/0210331 | A1 | 7/2017 | Komatsu et al. | |
| 2017/0274860 | A1 | 9/2017 | Abo et al. | |
| 2019/0193671 | A1* | 6/2019 | Hotta | B60R 21/2338 |
| 2019/0217806 | A1* | 7/2019 | Hotta | B60R 21/2338 |
| 2020/0101928 | A1* | 4/2020 | Ishii | B60R 21/2338 |
| 2020/0307486 | A1* | 10/2020 | Ishii | B60R 21/237 |

FOREIGN PATENT DOCUMENTS

| JP | 2007176211 A | * | 7/2007 | |
|---|---|---|---|---|
| JP | 2013071677 A | * | 4/2013 | B60R 21/2334 |
| JP | 2017-128279 A | | 7/2017 | |
| JP | 2017-177893 A | | 10/2017 | |
| JP | 2018075970 A | * | 5/2018 | |
| JP | 2019038399 A | * | 3/2019 | |
| WO | WO-2018131180 A1 | * | 7/2018 | B60R 21/2334 |

* cited by examiner

*Primary Examiner* — Keith J Frisby
(74) *Attorney, Agent, or Firm* — Posz Law Group, PLC

(57) ABSTRACT

A preparatory folded form is a form of an airbag in an initial stage in a folding process which has not yet been reduced in size for storage in a steering wheel. The airbag includes a driver-side wall, and a vehicle-side wall which includes an inlet port in a vicinity of the center, and a plurality of taken-in portions towards the outer edge for reducing a length of the outer edge of the vehicle-side wall. The preparatory folded form includes an upper-surface portion composed of a central portion of the driver-side wall, a lower-surface portion composed of a peripheral portion of the inlet port in the vehicle-side wall, and at least one invaginated portion that is composed of a portion of the airbag located between the upper- and lower-surface portions including the taken-in portions, and is invaginated in between the upper- and lower-surface portions towards the inlet port. The upper-surface portion, invaginated portion and lower-surface portion lie over one another.

8 Claims, 22 Drawing Sheets

Fig. 14
(A)
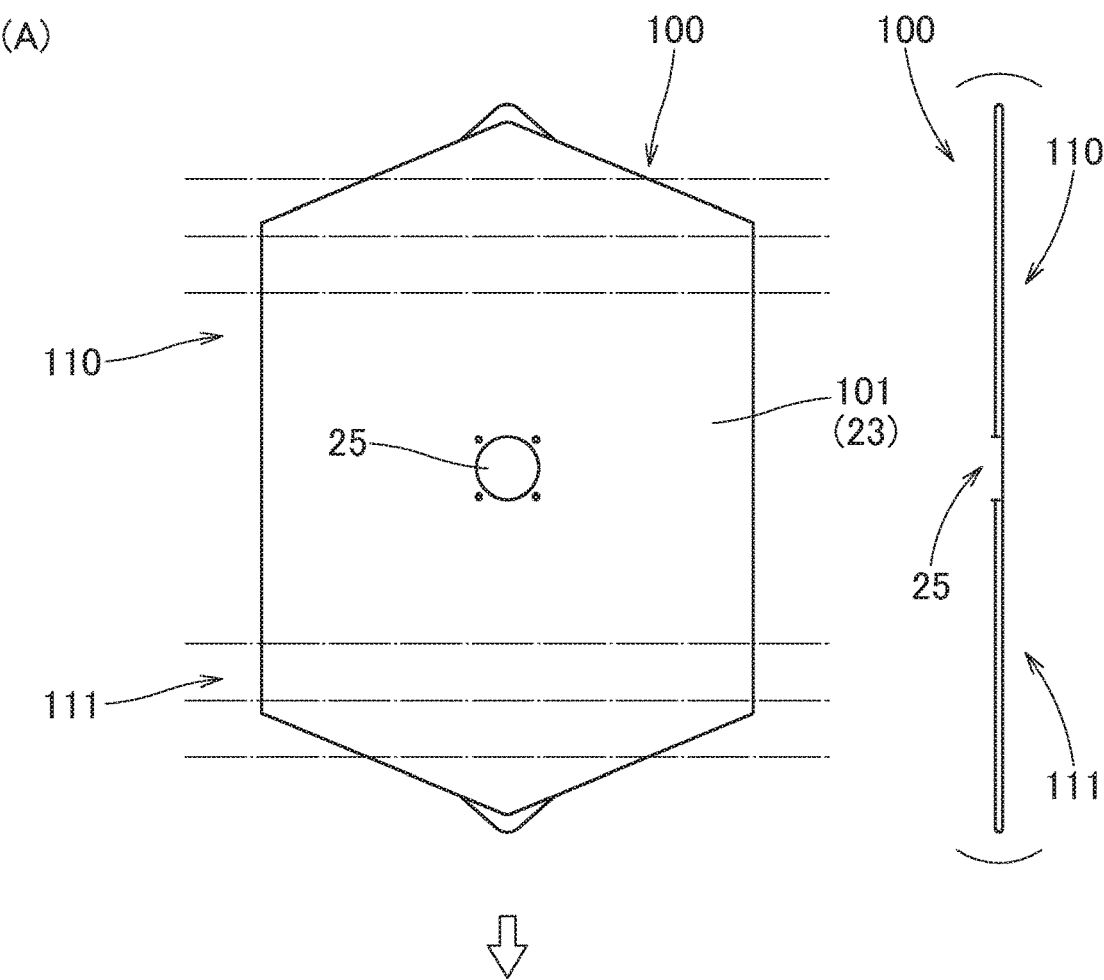
(B)
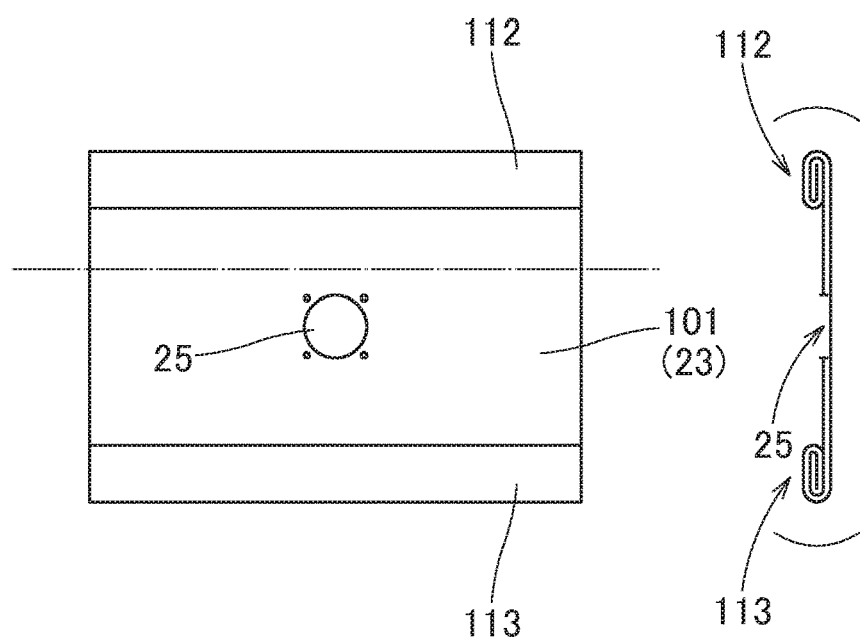

Fig. 17
(A)
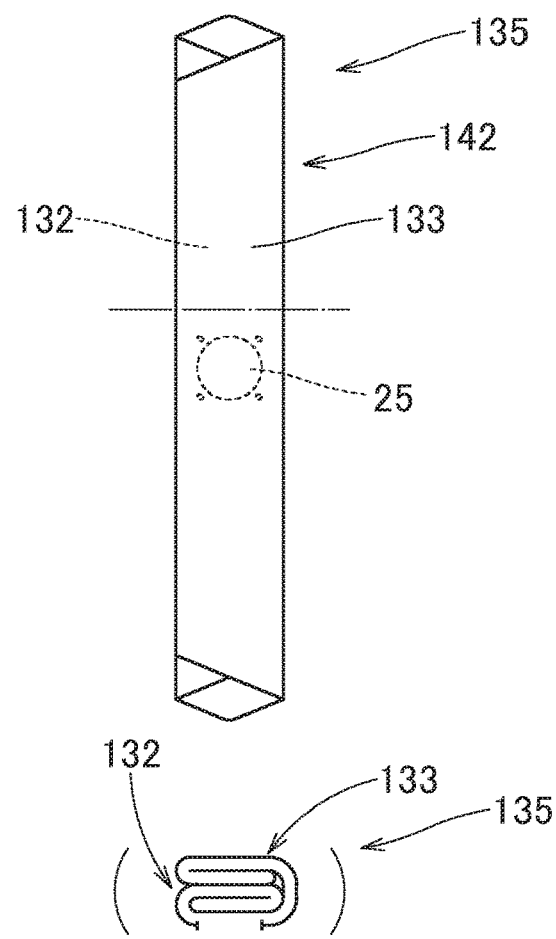
(B)
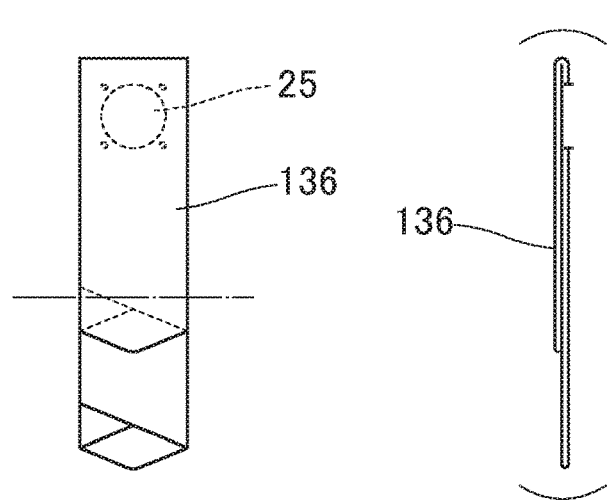

Fig. 19
(A)
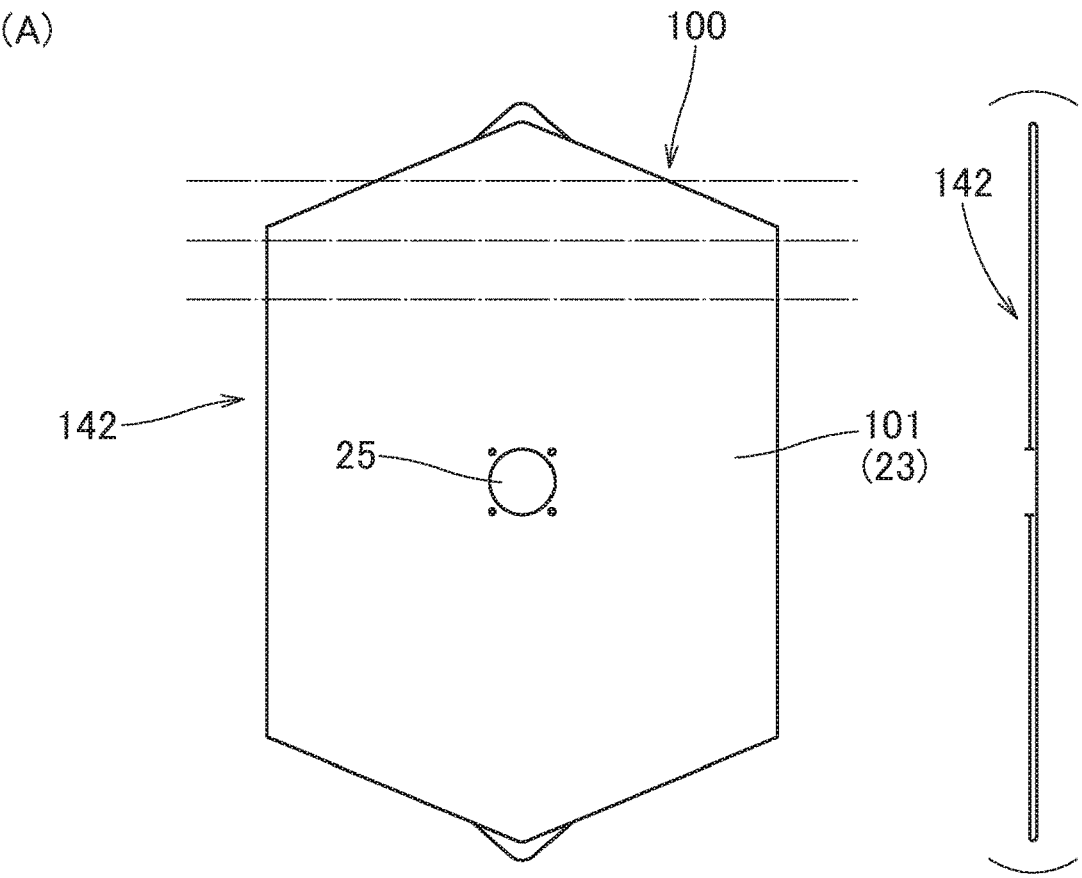
(B)
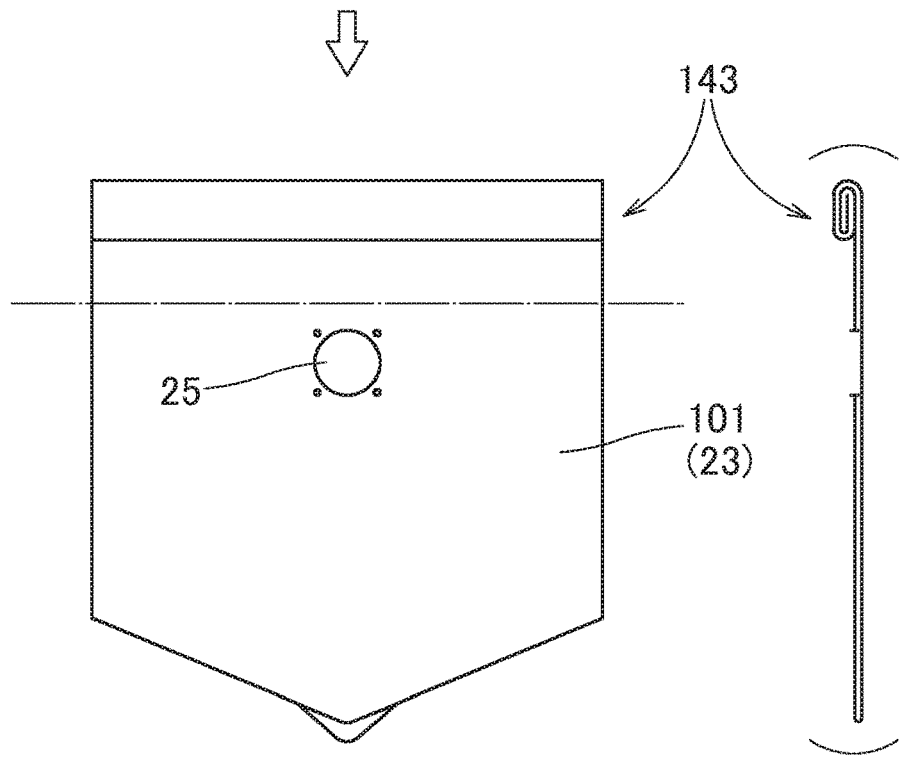

Fig. 20
(A)
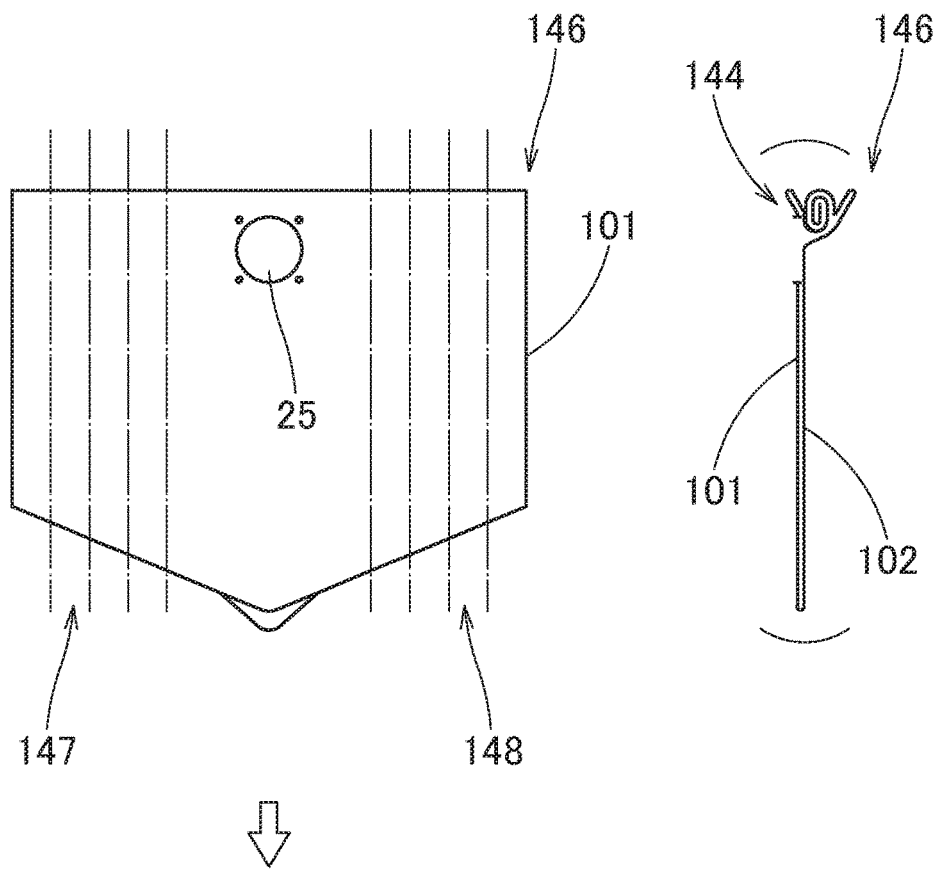
(B)
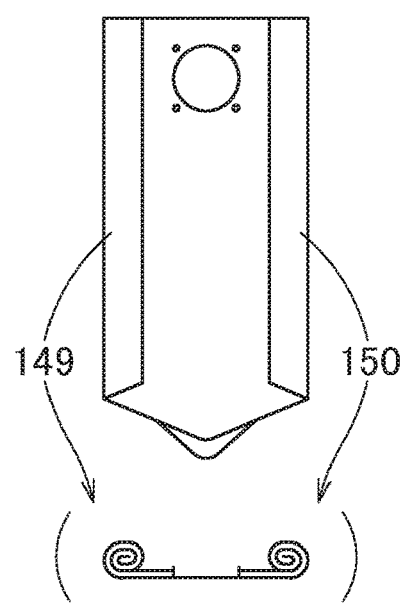

PREPARATORY FOLDED FORM OF AN AIRBAG

CROSS REFERENCE TO RELATED APPLICATIONS

The present application claims priority from Japanese Patent Application No. 2019-063644 of Nonoyama et al., filed on Mar. 28, 2019, and Japanese Patent Application No. 2020-021699 of Nonoyama et al., filed on Feb. 12, 2020, the entire disclosures of which are incorporated herein by reference.

BACKGROUND

1. Technical Field

The present invention relates to a preparatory folded form of an airbag for a steering wheel which is folded for storage in a storage location in the steering wheel.

2. Description of Related Art

JP 2017-128279 A and JP 2017-177893 A each disclose an airbag for a steering wheel that includes a vehicle-side wall which is deployable towards the steering wheel and a driver-side wall which is deployable towards the driver's seat and identical in round shape to the vehicle-side wall, and that is formed by joining together circumferential edges of the vehicle-side wall and driver-side wall. The airbag for a steering wheel of this kind is reduced in widths in front-rear and left-right directions for storage in a storage location, from a state in which the vehicle-side wall and driver-side wall are developed flatly while overlapping one another.

Since the vehicle-side wall and driver-side wall of the above-described airbag are identical in outer shape, it is easy to lay the walls over one another and develop them flatly. However, when the airbag is desired to be inflated into a bulky shape in thickness for adequately protecting a driver who is moving diagonally forward, by way of example, it would be required to form the vehicle-side wall and/or driver-side wall in a three-dimensional shape(s). An airbag composed of a vehicle-side wall and/or a driver-side wall each formed in a three-dimensional shape would be difficult to form into a flat preparatory folded form in which the vehicle-side wall and driver-side wall lie flatly over one another, prior to subsequent folding steps to reduce the widths in front-rear and left-right directions. This may further affect an ease of the subsequent folding steps to reduce the widths in front-rear and left-right directions. It would be desirable to provide a preparatory folded form of an airbag that is easy to fold for storage in a storage location despite of a three dimensional shape(s) of the vehicle-side wall and/or driver-side wall.

SUMMARY

An exemplary embodiment of the invention relates to a preparatory folded form of an airbag which is deployable over a steering wheel of a vehicle. The preparatory folded form is a form of the airbag in an initial stage in a folding process of the airbag which has not yet been subjected to further folding steps to reduce a size of the airbag in a front and rear direction and in a left and right direction for storage in a storage location of a steering wheel. The airbag includes a driver-side wall which is deployable towards a driver's seat and a vehicle-side wall which is deployable towards the steering wheel. The driver-side wall and vehicle-side wall are joined together by the outer circumferential edges. The vehicle-side wall includes: an inlet port for introducing an inflation gas, in a vicinity of a center of the vehicle-side wall; a plurality of taken-in portions that are located towards the outer circumferential edge of the vehicle-side wall for reducing a length of the outer circumferential edge of the vehicle-side wall; an untaken-in area that is disposed in a vicinity of the inlet port and has no taken-in portions; and a taken-in area that is disposed towards the outer circumferential edge of the vehicle-side wall and provided with the taken-in portions. The preparatory folded form of the airbag includes:

an upper-surface portion that is composed of a central portion of the driver-side wall;

a lower-surface portion that is composed of a portion of the untaken-in area disposed in a periphery of the inlet port; and at least one invaginated portion that is composed of a portion of the airbag located between the upper-surface portion and the lower-surface portion and including the taken-in area, and is invaginated in between the upper-surface portion and the lower-surface portion towards the inlet port. The upper-surface portion, the invaginated portion and the lower-surface portion lie over one another.

It is desired that each of opposite terminals of a crease which forms a boundary between the invaginated portion and the lower-surface portion generally coincides in position with a terminal of one of the taken-in portions.

When the preparatory folded form of the airbag is configured like this, it is further desired that the upper-surface portion is configured such that the width in the front and rear direction is greater than that in the left and right direction.

In this instance, it is further desired that a front end of the upper-surface portion protrudes farther forward than a front end of the lower-surface portion.

The preparatory folded form of the airbag may be configured such that one each invaginated portion is disposed over a generally entire area in the front and rear direction of the preparatory folded form, on left and right sides of the inlet port. In this case, it is desired that each of the invaginated portions includes an inner crease that forms a leading end of the invaginated portion, and that a distance between the inner creases increases towards a rear end of the preparatory folded form.

BRIEF DESCRIPTION OF DRAWINGS

FIGS. 14 and 15 schematically illustrate a folding process of the airbag in accordance with the exemplary embodiment.

FIGS. 16 to 18 schematically illustrate a modification of the folding process of the airbag.

FIGS. 19 to 21 schematically illustrate another modification of the folding process of the airbag.

DETAILED DESCRIPTION

Exemplary embodiments are described below with reference to the accompanying drawings. However, the invention is not limited to the embodiments disclosed herein. All modifications within the appended claims and equivalents relative thereto are intended to be encompassed in the scope of the claims.

Figure 1:
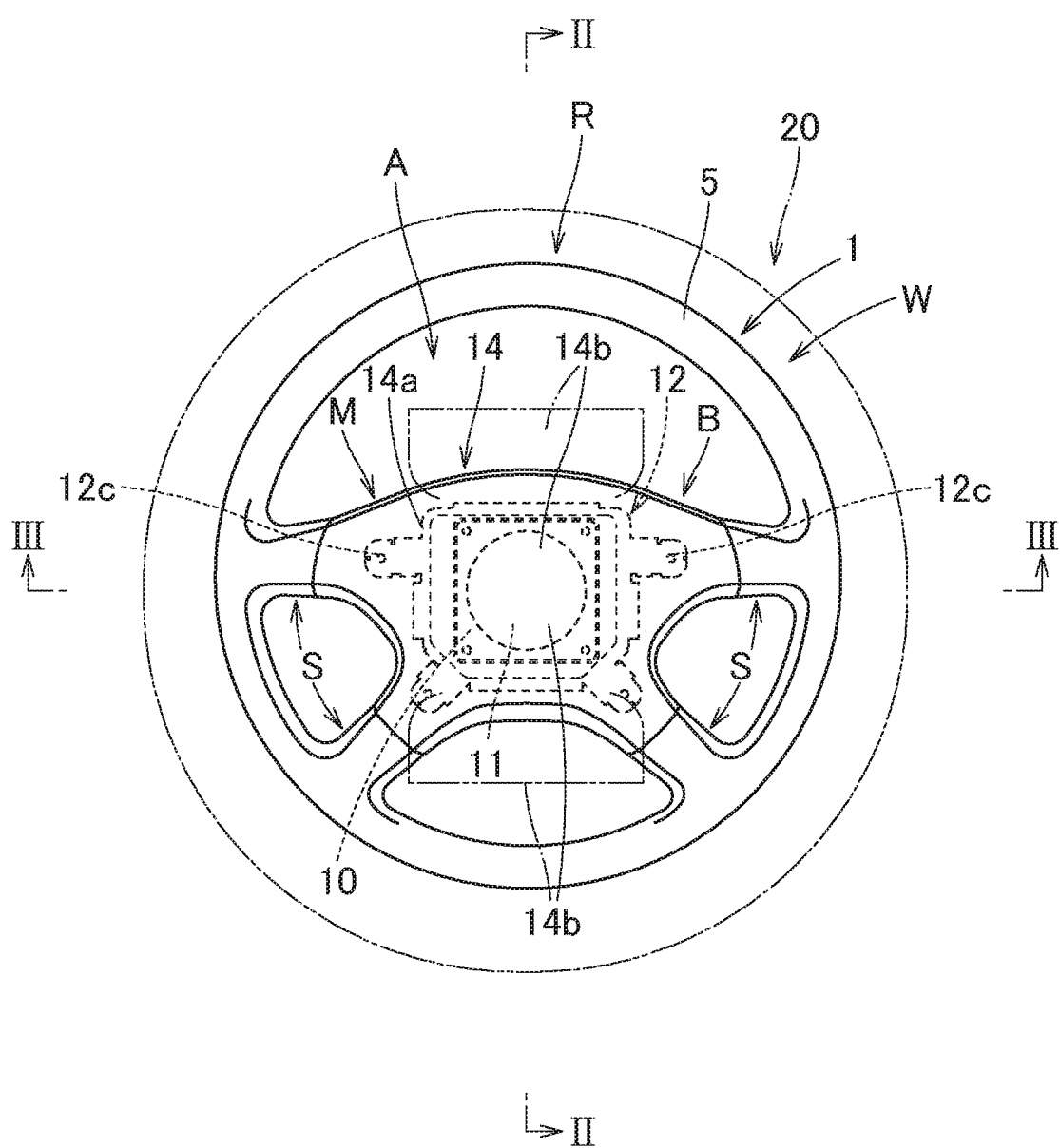
FIG. 1 is a schematic plan view of a steering wheel on which an airbag device using an airbag in accordance with an exemplary embodiment is mounted.
Figure 2:
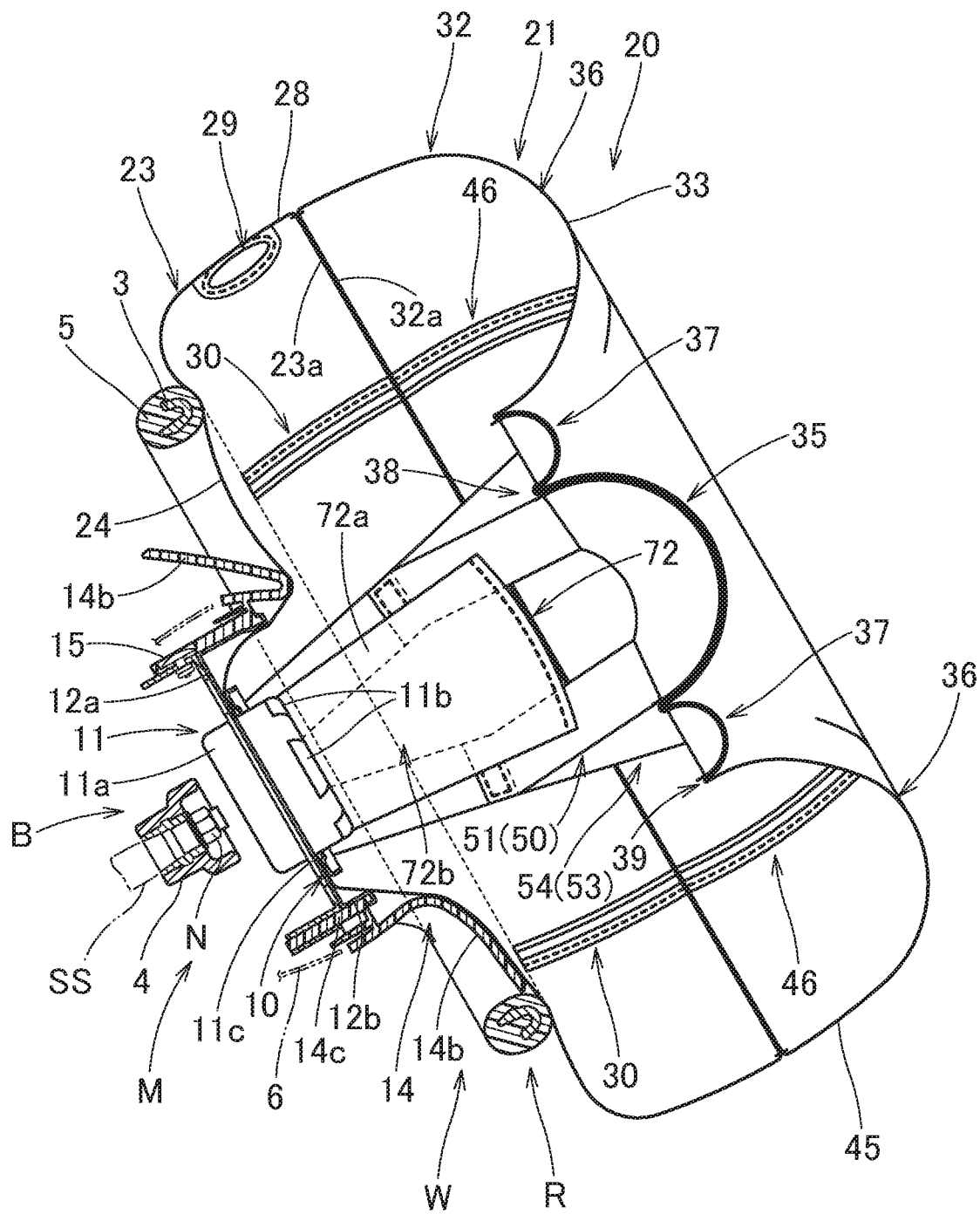
FIG. 2 is a schematic sectional view of the airbag device of FIG. 1 as actuated, taken along line II-II of FIG. 1.
Figure 3:
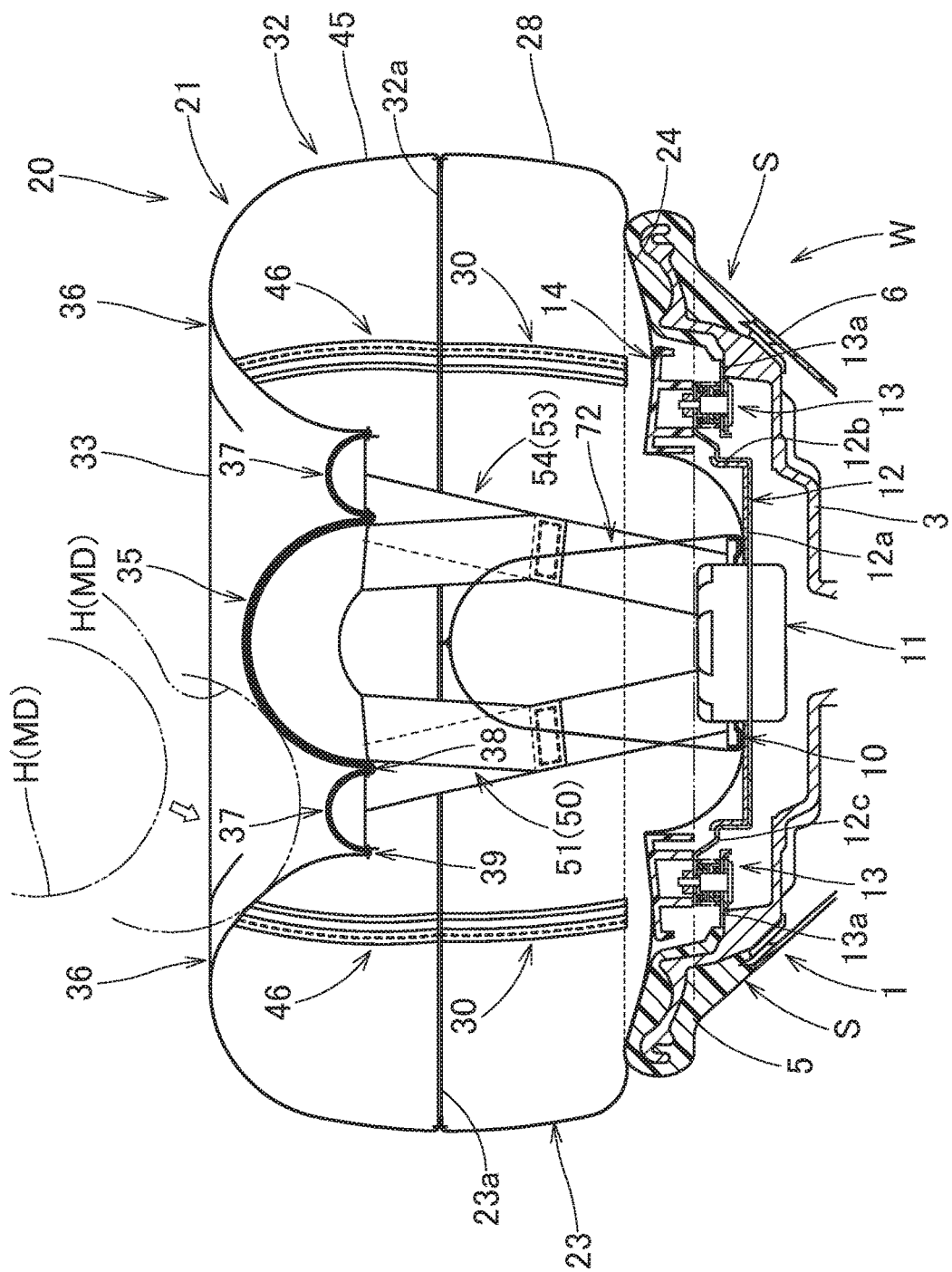
FIG. 3 is a schematic sectional view of the airbag device of FIG. 1 as actuated, taken along line III-III of FIG. 1.
Figure 4:
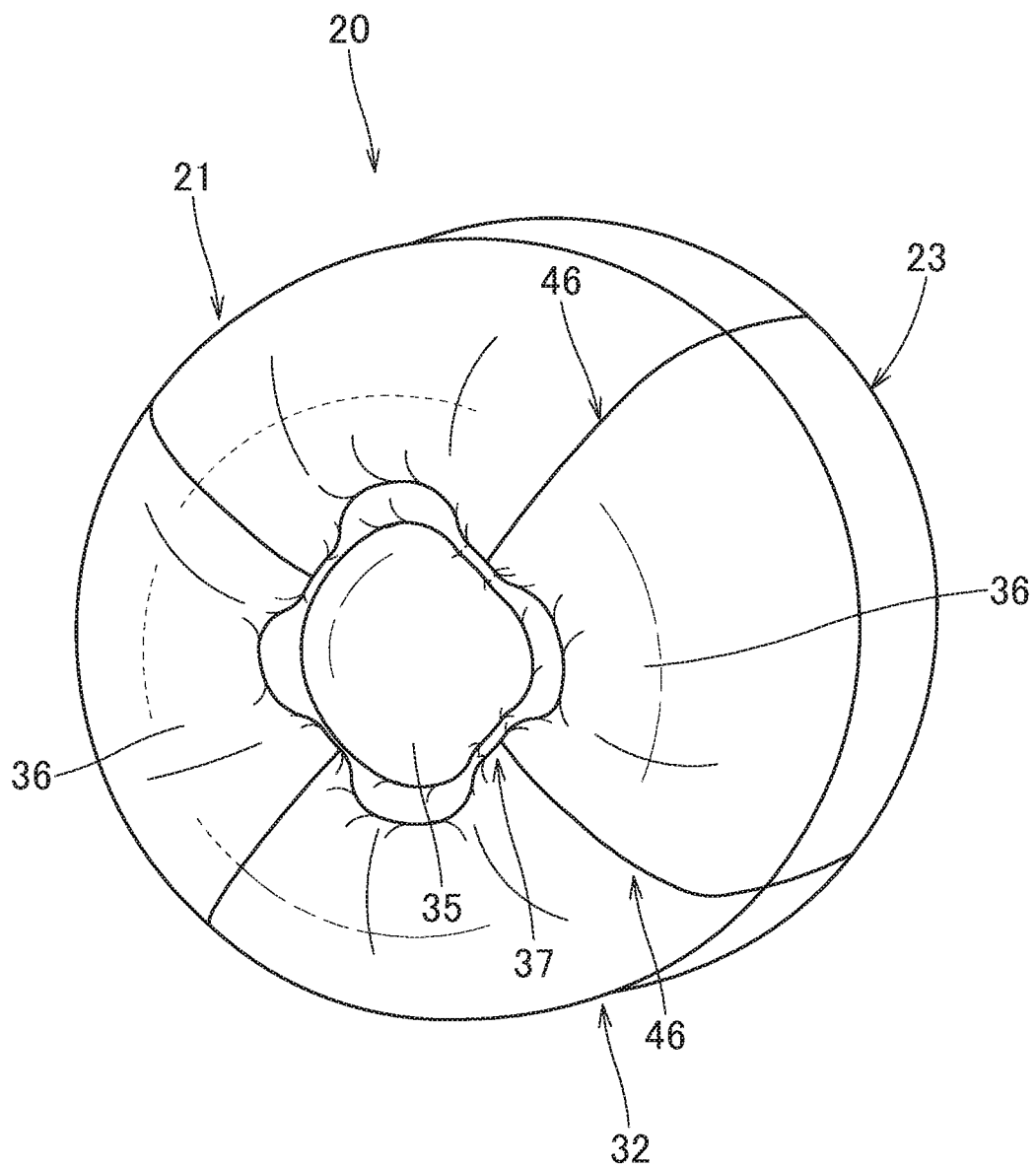
FIG. 4 is a schematic perspective view of the airbag in accordance with the exemplary embodiment as inflated by itself.

An airbag 20 according to an exemplary embodiment is used in an airbag device M for a steering wheel which is mounted on a steering wheel W of a vehicle, as depicted in FIGS. 1 to 3. The steering wheel W includes a wheel body 1 and the airbag device M. The wheel body 1 includes an annular rim R which is adapted to be gripped with hands for steering, a boss section B which is disposed generally at the center of the rim R and connected to the steering shaft SS (FIG. 2), and four spokes S which interconnect the rim R and the boss section B. The airbag device M is mounted on top of the boss section B.

Unless otherwise specified, front and rear, up and down, and left and right directions in this description are based on the steering wheel W mounted on board and steered straight ahead. Thus the up and down direction refers to an up and down direction extending along an axial direction of the steering shaft SS, the front and rear direction refers to a front and rear direction of the vehicle which corresponds to a direction perpendicular to the axial direction of the steering shaft SS, and the left and right direction refers to a left and right direction of the vehicle which corresponds to a direction perpendicular to the axial direction of the steering shaft SS.

As shown in FIGS. 1 to 3, the wheel body 1 includes a core 3 which is made from such metal as aluminum alloy, and has such a shape that the rim R, the boss section B and the spokes S are interconnected. A cladding layer 5 made from synthetic resin covers the core 3 on the rim R and regions of the spokes S adjoining the rim R. A boss 4 made from steel is disposed in the boss section B of the core 3 for receiving and fastening with the steering shaft SS with a nut N. A lower cover 6 of synthetic resin is disposed in a lower portion of the wheel body 1 for covering a lower side of the boss section B.

As shown in FIGS. 1 to 3, the airbag device M, which is disposed in the boss section B of the steering wheel W, includes an airbag 20 which is stored in a folded-up configuration, an inflator 11 for supplying the airbag 20 with an inflation gas, a case or storage 12 which houses and holds the airbag 20 and inflator 11, an airbag cover 14 which covers the airbag 20, and a retainer 10 which is used to mount the airbag 20 and inflator 11 on the case 12.

As shown in FIGS. 2 and 3, the inflator 11 includes a body 11a which is formed into a generally pot-like shape and provided with a plurality of gas discharge ports 11b, and a flange 11c used to mount the inflator 11 on the case 12. The flange 11c includes a plurality of not-shown through holes for receiving not-shown bolts of the retainer 10. The case (or storage) 12 is made of sheet metal, and includes a bottom wall 12a which is formed into a generally rectangular board and includes an opening for receiving the inflator 11 from below, and a circumferential wall 12b which extends upwardly and downwardly from an outer circumferential edge of the bottom wall 12a, as shown in FIGS. 2 and 3. As shown in FIG. 1, the circumferential wall 12b is provided with, on the top, a plurality of mounting tongues 12c which extend outwardly. A mounting base 13a of a horn switch mechanism 13 is mounted on each of the mounting tongues 12c (FIG. 3). With the aid of the mounting bases 13a, the case 12 is secured to the core 3 of the steering wheel W, and the airbag device M is mounted on the boss section B of the wheel body 1 as connected to the steering shaft SS. As shown in FIG. 2, the circumferential wall 12b of the case 12 is coupled with a side wall 14c of the airbag cover 14 through the use of rivets 15 or the like. In the illustrated embodiment, the airbag 20 and inflator 11 are secured to the bottom wall 12a of the case 12 through the use of the not-shown bolts of the retainer 10. More specifically, the retainer 10 is housed in the airbag 20 such that the bolts go through later-described mounting holes 26a formed in a periphery 26 of a later-described inlet port 25 of the airbag 20 (i.e. a mounting portion 26), the bottom wall 12a of the case 12, and the flange 11c of the inflator 11, then fastened with not-shown nuts. Thus the airbag 20 and inflator 11 are secured to the bottom wall 12a of the case 12.

Figure 5:
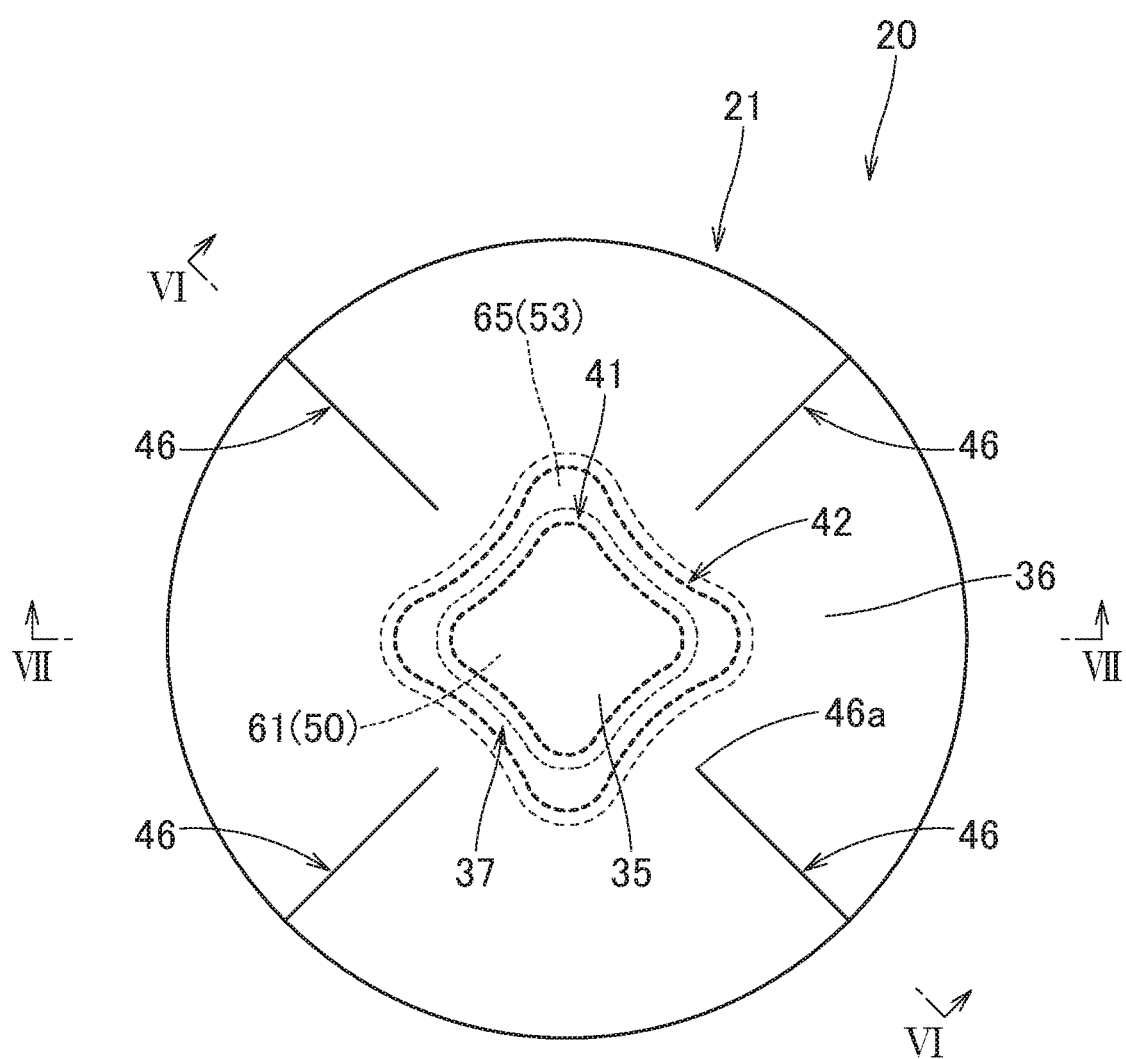
FIG. 5 is a schematic plan view of the airbag of FIG. 4 as inflated by itself.
Figure 6:
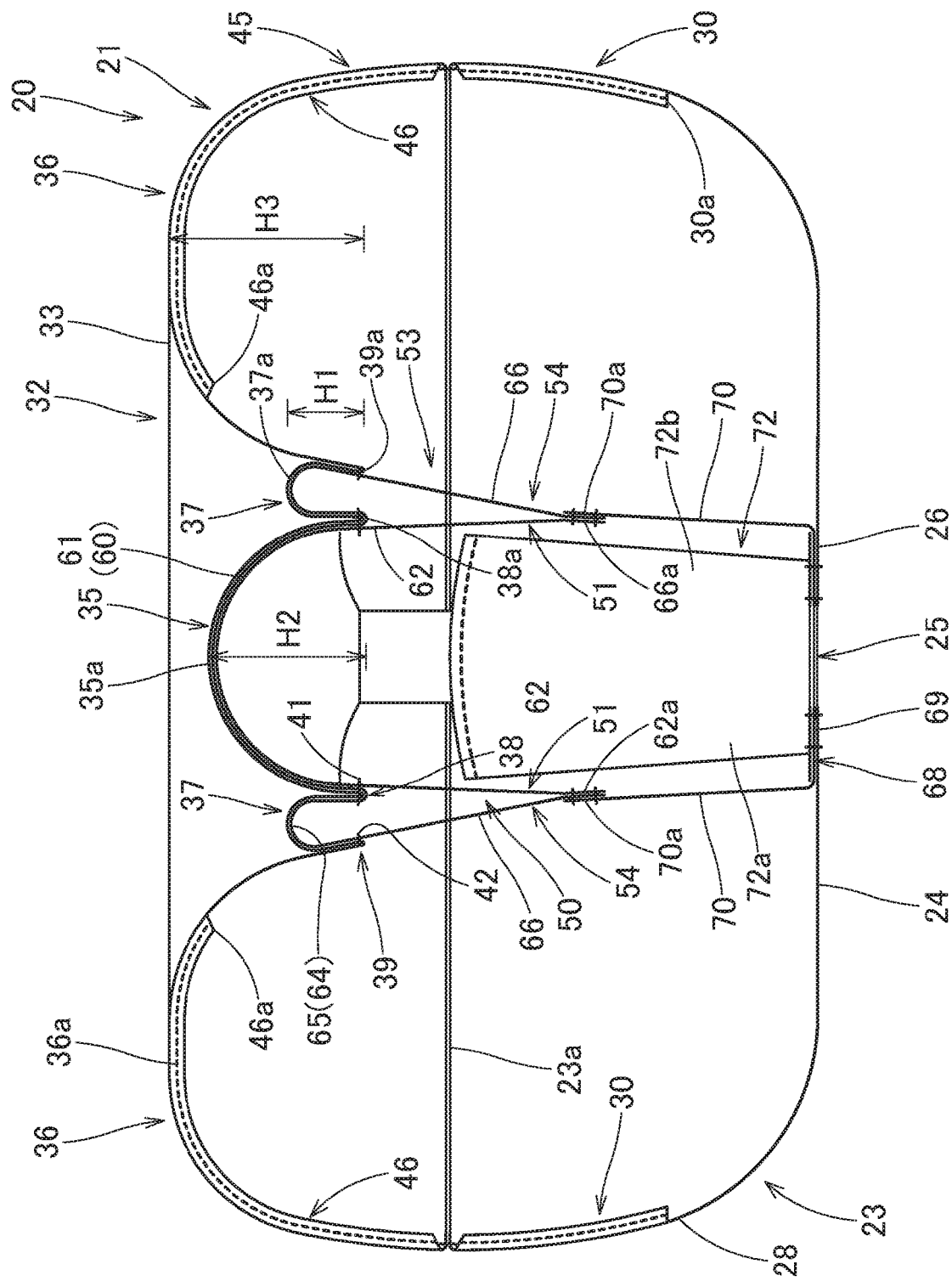
FIG. 6 is a schematic sectional view taken along line VI-VI of FIG. 5.
Figure 7:
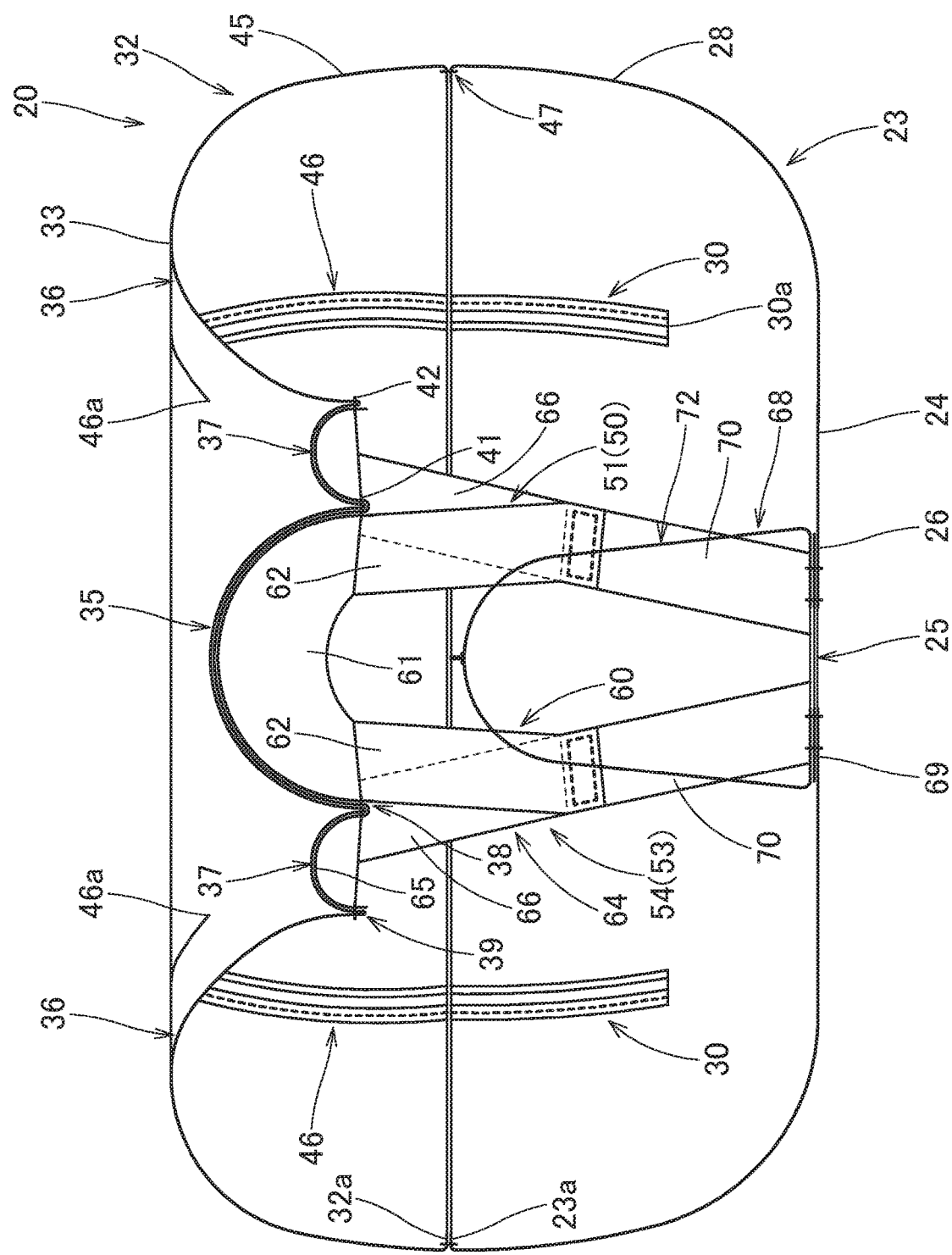
FIG. 7 is a schematic sectional view taken along line VII-VII of FIG. 5.

As shown in FIGS. 2 to 7, the airbag 20 includes a bag body 21, a tether 50 and a tether 53 which are disposed inside the bag body 21 for controlling the shape of the bag body 21 as fully inflated, and a redirecting cloth 72 for redirecting an inflation gas as has entered into the bag body 21. As can be seen in FIGS. 5 to 7, the bag body 21 is designed to be inflatable into such a pot-like bag shape that is generally circular as viewed from above. The bag body 21 of the illustrated embodiment includes a vehicle-side wall 23 which is deployable towards the steering wheel W, and a driver-side wall 32 which is deployable towards the driver MD (or driver's seat). The bag body 21 is formed by joining outer circumferential edges 23a, 32a of the vehicle-side wall 23 and driver-side wall 32 together, and is designed to cover an upper surface of the steering wheel W generally all over when deployed.

Figure 9A:
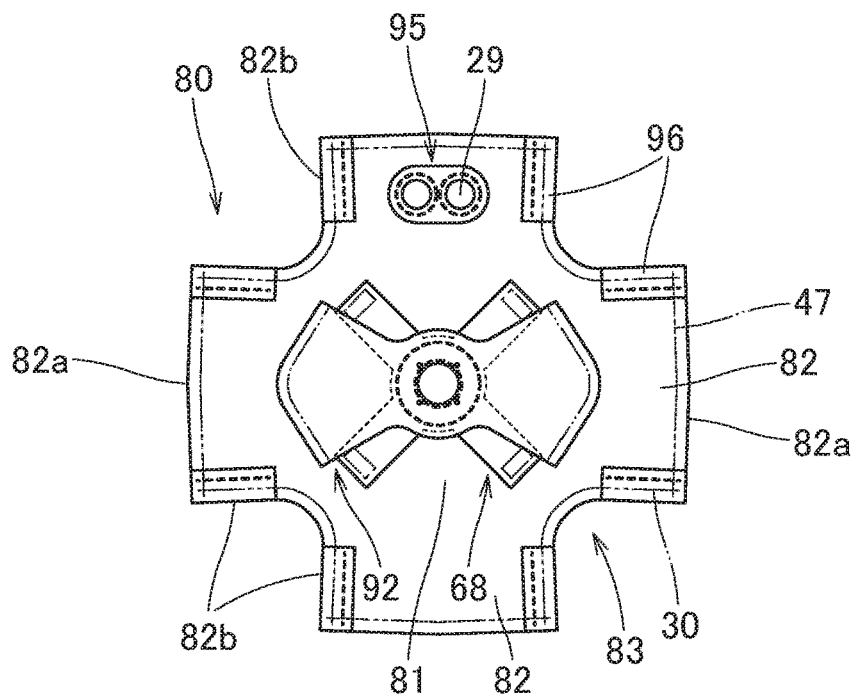
FIG. 9A is a plan view of a vehicle-side panel of the airbag of FIG. 4 before formation of taken-in portions.
Figure 10:
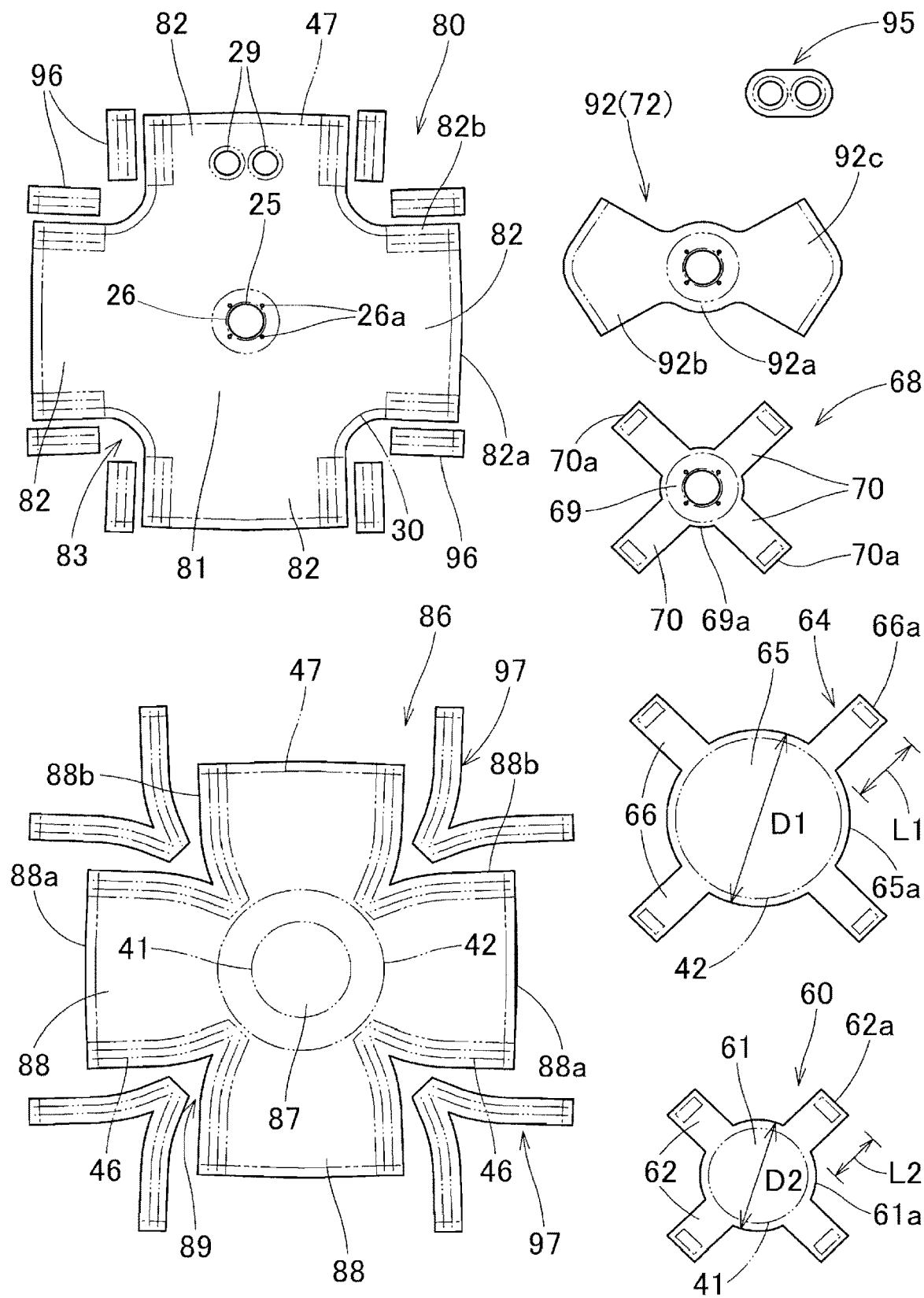
FIG. 10 depicts base members of the airbag of FIG. 4 in plan.

In the illustrated embodiment, the vehicle-side wall 23 at airbag deployment has a generally round-box shape which has a bottom wall 24 deployable towards the steering wheel body 1 and a lower circumferential wall 28 which extends from an outer circumferential edge of the bottom wall 24, as can be seen in FIGS. 6 and 7. The vehicle-side wall 23 is composed of a vehicle-side panel 80 having a generally cross shape as depicted in FIGS. 9A and 10, and is formed into the box shape by having four taken-in portions (or tucks) 30, each of which is formed by closing a later-described cut-out portion 83 of the vehicle-side panel 80, at four radial positions around a later-described inlet port 25, in the outer circumferential edge 23a. That is, the taken-in portions (tucks) 30 are formed by closing the four cut-out portions 83 of the vehicle-side panel 80 and reducing a circumferential length of the vehicle-side panel 80. These taken-in portions 30 are located in the lower circumferential wall 28. That is, in the vehicle-side wall 23 of the bag body 21 of the illustrated embodiment, the bottom wall 24 serves as an untaken-in area that is disposed in a vicinity of a later-described inlet port 25 and has no taken-in portions, and the lower circumferential wall 28 serves as a taken-in area that is disposed in a vicinity of the outer circumferential edge 23a and provided with the taken-in portions 30.

The vehicle-side wall 23 is provided with, generally at the center of the bottom wall 24, a generally round inlet port 25 for receiving the inflator body 11a from below for introducing an inflation gas emitted from the gas discharge ports 11b into the bag body 21. A peripheral area of the inlet port 25 in the bottom wall 24 serves as a mounting portion 26 of the bag body 21. The mounting portion 26 includes four mounting holes 26a for receiving the not-shown bolts of the retainer 10, as can be seen in FIG. 10. Two round vent holes 29 for releasing an extra inflation gas are disposed at bilaterally symmetric positions in a front portion of the lower circumferential wall 28 of the vehicle side wall 23 as deployed. That is, the vent holes 29 are disposed at an area of the bag body 21 as deployed which rises from the rim R of the steering wheel W, as can be seen in FIG. 2.

Figure 9B:
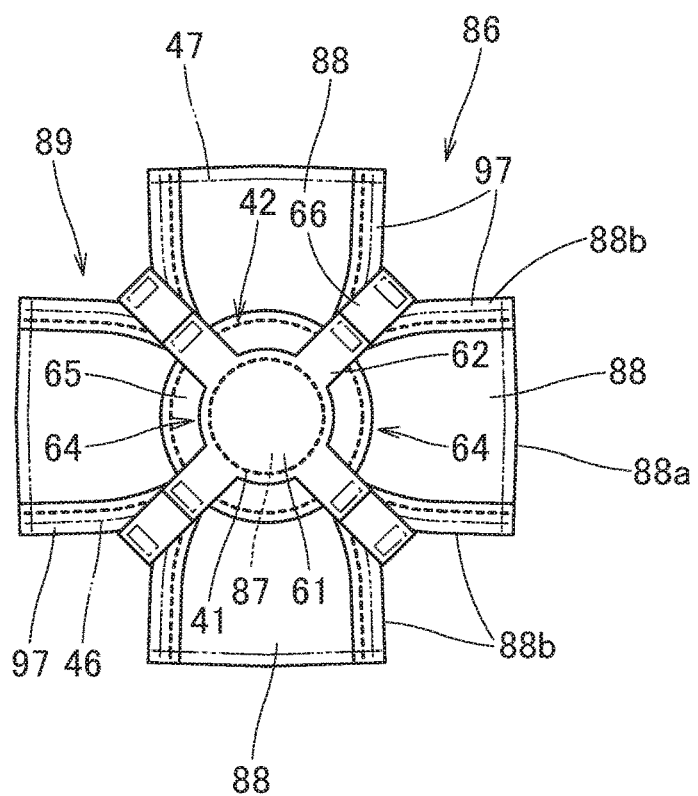
FIG. 9B is a plan view of a driver-side panel of the airbag of FIG. 4 before formation of taken-in portions.

The driver-side wall 32 at airbag deployment has a generally round-box shape which has a top panel portion 33 deployable towards the driver MD and an upper circumferential wall 45 which extends from an outer circumferential edge of the top panel portion 33, as can be seen in FIGS. 6 and 7. The driver-side wall 32 is composed of a driver-side panel 86 having a generally cross shape as depicted in FIGS. 9B and 10, and is formed into the box shape by having four taken-in portions (or tucks) 46, each of which is formed by closing a later-described cut-out portion 89 of the driver-side panel 86, at four radial positions in the outer circumferential edge 32a. That is, also in the driver-side wall 32, the taken-in portions (tucks) 46 are formed by closing the four cut-out portions 89 of the driver-side panel 86 and reducing a circumferential length of the driver-side panel 86. In the illustrated embodiment, the taken-in portions (tucks) 46 coincide in position with the taken-in portions 30 in the vehicle-side wall 23, thus the taken-in portions 46 are respectively continuous with the taken-in portions 30.

Referring to FIGS. 4 to 7, the top panel portion 33 of the driver-side wall 32 as inflated includes a central protruding portion 35 which is disposed in a vicinity of the center of the top panel portion 33 and protrudes towards the driver, a circumferential protruding portion 36 which is disposed in a vicinity of an outer edge of the top panel portion 33 and protrudes towards the driver, and a small protruding portion 37 which is disposed between the central protruding portion 35 and circumferential protruding portion 36 and protrudes towards the driver. The small protruding portion 37 is smaller in protruding amount than the central protruding portion 35 and circumferential protruding portion 36. The central protruding portion 35 is generally round as viewed from above the bag body 21 as inflated (i.e. from the driver), and is configured such that the center generally coincides with the center of the driver-side wall 32. The small protruding portion 37 and circumferential protruding portion 36 are formed into concentric annuluses as viewed from above the bag body 21 as inflated (i.e. from the driver). That is, both of the small protruding portion 37 and circumferential protruding portion 36 are continuous generally all the way around the central protruding portion 35. In this specific embodiment, the unevenness formed by the central protruding portion 35, circumferential protruding portion 36 and small protruding portion 37 are created by a center tether 50 and an outer tether 53 disposed inside the bag body 21.

Figure 8:
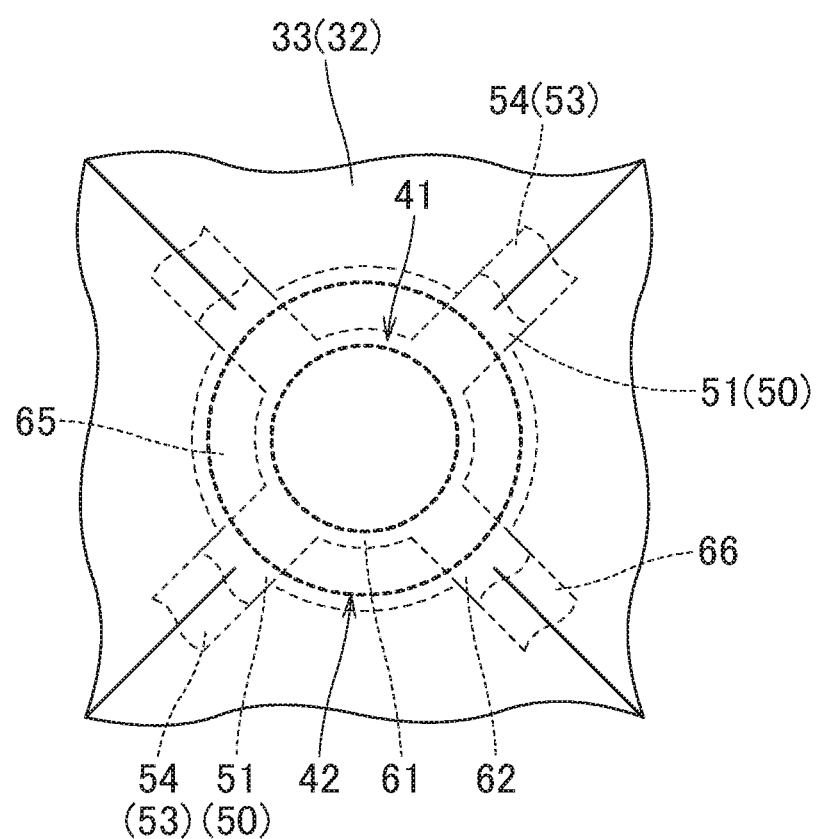
FIG. 8 is a partial enlarged schematic plan view of a vicinity of a center of a driver-side wall of the airbag of FIG. 4.

Referring to FIGS. 6 and 7, the center tether 50 connects a boundary area between the central protruding portion 35 and small protruding portion 37 and the peripheral area of the inlet port 25 (i.e. the mounting portion 26) in the bag body 21. The outer tether 53 connects a boundary area between the circumferential protruding portion 36 and small protruding portion 37 and the peripheral area of the inlet port 25 (i.e. the mounting portion 26) in the bag body 21. That is, the boundary area between the central protruding portion 35 and small protruding portion 37 forms a recessed portion 38 which is pulled by the center tether 50 and recessed towards the vehicle-side wall 23, and the boundary area between the circumferential protruding portion 36 and small protruding portion 37 forms a recessed portion 39 which is pulled by the outer tether 53 and recessed towards the vehicle-side wall 23. In this specific embodiment, each of the center tether 50 and outer tether 53 includes four tether bodies 51/54, and each set of the four tether bodies 51/54 are radially arranged around the center of the driver-side wall 32 which coincides with the center of the inlet port 25. More specifically, as can be seen in FIG. 8, the tether bodies 51, 54 of each of the center tether 50 and outer tether 53 are positioned to the left front, right front, left rear and right rear of the center of the driver-side wall 32 (i.e. of the central protruding portion 35), In other words, in the illustrated embodiment, the four tether bodies 51 of the center tether 50 and four tether bodies 54 of the outer tether 53 are arranged generally at the same positions as viewed from above the bag body 21 as fully inflated, generally at 90-degree intervals around the center of the driver-side wall 32. In the illustrated embodiment, moreover, the tether bodies 51, 54 of the center tether 50 and outer tether 53 are located generally at the same positions as the taken-in portions 30, 46, as can be seen in FIGS. 6 and 7.

That is, in the illustrated embodiment, the recessed portion 38 that forms the boundary between the central protruding portion 35 and small protruding portion 37 and the recessed portion 39 that forms the boundary between the circumferential protruding portion 36 and small protruding portion 37 are not pulled towards the vehicle-side wall 23 as a whole by the center tether 50 and outer tether 53, but pulled directly towards the vehicle-side wall 23 only at the four, generally equally spaced positions by the tether bodies 51, 54, However, as will be described later, the center tether 50 is joined to the driver-side wall 32 (or top panel portion 33) with a seam 41 by an outer circumferential edge 61a of a later-described generally round joint portion 61 of a driver-side section 60. The outer tether 53 is also joined to the driver-side wall 32 (or top panel portion 33) with a seam 42 by an outer circumferential edge 65a of a later-described generally round joint portion 65 of a driver-side section 64. The seam 41 and the seam 42 are concentric as can be seen in FIG. 8. Accordingly, each of the recessed portions 38 and 39 dents towards the seam 41/42 (in other words, dents with the seam 41/42 disposed at the bottom), thus is recessed all the way around though its portions with no tether bodies 51, 54 are slightly smaller in recessed amount than portions where the tether bodies 51, 54 are located, as can be seen in FIGS. 6 and 7. Further, as can be seen in FIGS. 6 and 7, the small protruding portion 37 has a greater width in the areas with no tether bodies 51, 54 than in the areas where the tether bodies 51, 54 are located, and the circumferential protruding portion 36 has a gentler slope in the inner surface (i.e. in the surface facing towards the small protruding portion 37) in the areas with no tether bodies 51, 54 than in the areas where the tether bodies 51, 54 are located. As viewed from above the airbag 20 as inflated, each of the seams 41 and 42 has such a shape that the portions where the tether bodies 51/54 are located dent towards the center of the driver-side wall 32, as can be seen in FIG. 5. That is, the central protruding portion 35 which is composed of an area inside the seam 41 is not strictly round, and neither the small protruding portion 37 which is composed of an area between the seams 41 and 42 nor the circumferential protruding portion 36 which is composed of an area outside of the seam 42 are not strictly round annuluses.

In the illustrated embodiment, moreover, the recessed portion 38 forming the boundary between the central protruding portion 35 and small protruding portion 37 and the recessed portion 39 forming the boundary between the circumferential protruding portion 36 and small protruding portion 37 have a generally same recessed amount, as can be seen in FIGS. 6 and 7. In the illustrated embodiment, a protruding amount of the central protruding portion 35 towards the driver (in other words, a distance between the leading end 38a, 39a of the recessed portion 38, 39 and the upper end 35a) at full airbag inflation is smaller than a protruding amount of the circumferential protruding portion 36 towards the driver (i.e. a distance between the leading end 38a, 39a of the recessed portion 38, 39 and the upper end 36a), and greater than the protruding amount of the small protruding portion 37 towards the driver (i.e. a distance between the leading end 38a, 39a of the recessed portion 38, 39 and the upper end 37a). In this specific embodiment, in the areas where the tether bodies 51, 54 are located, a ratio of the protruding amount H1 (FIG. 6) of the small protruding portion 37, the protruding amount H2 of the central protruding portion 35, and the protruding amount H3 of the circumferential protruding portion 36 is approximately 2:4:5.

As described above, the airbag 20 internally includes the center tether 50 and outer tether 53 for controlling the shape of the bag body 21 as inflated. As described above, the center tether 50 connects the boundary area between the central protruding portion 35 and small protruding portion 37 (i.e. the leading end 38a of the recessed portion 38) and the peripheral area of the inlet port 25 (i.e. the mounting portion 26) in the bag body 21, and the outer tether 53 connects the boundary area between the circumferential protruding portion 36 and small protruding portion 37 (i.e. the leading end 39a of the recessed portion 39) and the peripheral area of the inlet port 25 (i.e. the mounting portion 26) in the bag body 21. Each of the center tether 50 and outer tether 53 includes a driver-side section 60/64 which is disposed on the side of the driver-side wall 32, and a vehicle-side section 68 which is disposed on the side of the vehicle-side wall 23. In this specific embodiment, the vehicle-side section 68 is shared by the center tether 50 and outer tether 53. Accordingly, one each center tether 50 and outer tether 53 form a bifurcate shape branching off from the vehicle-side section 68, as can be seen in FIG. 6.

The driver-side section 60 of the center tether 50 includes a joint portion 61 having a generally round shape, and four tether-forming portions 62 that extend radially from an outer circumferential edge 61a of the joint portion 61 each in a band shape, as can be seen in FIG. 10. The tether-forming portions 62 are formed generally at 90-degree intervals about the center of the joint portion 61 and extend diagonally to the left front, right front, left rear and right rear from the joint portion 61 as laid flat. The driver-side section 64 of the outer tether 53 includes a joint portion 65 having a generally round shape, and four tether-forming portions 66 that extend radially from an outer circumferential edge 65a of the joint portion 65 each in a band shape, as can be seen in FIG. 10. The joint portion 65 of the driver-side section 64 of the outer tether 53 is greater in outer diameter than the joint portion 61 of the driver-side section 60 of the center tether 50. In this specific embodiment, an outer diameter D1 (FIG. 10) of the joint portion 65 is approximately three halves of an outer diameter D2 of the joint portion 61. The tether-forming portions 66 of the driver-side section 64 of the outer tether 53 are formed at locations consistent with the tether-forming portions 62 of the driver-side section 60 of the center tether 50, as can be seen in FIG. 9B. In the illustrated embodiment, moreover, a length L1 (FIG. 10) of each of the tether-forming portions 66 of the driver-side section 64 of the outer tether 53 is approximately 1.5 times of a length L2 of each of the tether-forming portions 62 of the driver-side section 60 of the center tether 50. The vehicle-side section 68 of the center tether 50 and outer tether 53 includes a joint portion 69 having a generally round shape, and four tether-forming portions 70 that extend radially from an outer circumferential edge 69a of the joint portion 69 each in a band shape, as can be seen in FIG. 10. The joint portion 69 is provided with a plurality of openings (reference numeral omitted) corresponding to the inlet port 25 and mounting holes 26a, and joined to the mounting portion 26 (i.e. the peripheral area of the inlet port 25) of the bag body 21 by an entirety of the outer circumferential edge 69a. The tether-forming portions 70 are formed to correspond to the tether-forming portions 62 and 66 of the driver-side sections 60 and 64.

In the illustrated embodiment, the joint portions 61, 65 are joined to the driver-side wall 32 by the outer circumferential edges 61a, 65a, the joint portion 69 is joined to the mounting portion 26 of the vehicle-side wall 23 by the outer circumferential edge 69a, and leading ends 62a, 66a, 70a of corresponding tether-forming portions 62, 66, 70 are sewn (joined) together with sewing threads. Thus the center tethers 50 and outer tethers 53 (i.e. tether bodies 51 and 54) are formed inside the bag body 21 so as to be deployed each in a bifurcate (or Y shaped) fashion. In the illustrated embodiment, moreover, the tether bodies 51 of the center tether 50 and tether bodies 54 of the outer tether 53 are located at positions corresponding to the taken-in portions 30, 46 formed in the vehicle-side wall 23 and driver-side wall 32 of the bag body 21. Further, each of the tether bodies 54 of the outer tether 53 is located in a vicinity of a terminal 46a of each of the taken-in portions 46 formed in the driver-side wall 32. With this configuration, when the bag body 21 is inflated, the vicinities of the terminals 46a of the taken-in portions 46 in the top panel portion 33 are pulled by the tether bodies 54 of the outer tether 53, thus prevented from protruding upward. Accordingly, the vicinities of the terminals 46a of the taken-in portions 46 which are located farther towards the small protruding portion 37 than the protruding end (i.e. upper end 36a) of the circumferential protruding portion 36 are prevented from protruding upward partially, but extend towards the small protruding portion 37 gently at full airbag inflation, as can be seen in FIGS. 6 and 7.

As can be seen in FIGS. 6 and 7, the redirecting cloth 72 is configured to be disposed over the inlet port 25 inside the bag body 21 for redirecting an inflation gas which has flown in via the inlet port 25 forward and rearward at airbag deployment. To this end, the redirecting cloth 72 is formed generally into a tube having two outlet openings 72a, 72b in the front end and rear end. In the illustrated embodiment, the redirecting cloth 72 is composed of a base member 92 depicted in FIG. 10. The base member 92 includes a central portion 92a, and a left portion 92b and a right portion 92c each having a generally sectorial shape and extending to the left and right from the central portion 92a. The central portion 92a is joined (or sewn) to the peripheral area of the inlet port 25 of the bag body 21, and the left and right portions 92b and 92c are sewn (joined) together by the outer edges, thus forming the redirecting cloth 72 having the openings 72a, 72b in the front and rear ends.

The bag body 21 of the illustrated embodiment is composed of a vehicle-side panel 80 forming the vehicle-side wall 23 and a driver-side panel 86 forming the driver-side wall 32.

As can be seen in FIGS. 9A and 10, the vehicle-side panel 80 is formed into a generally cross-shaped outer contour, and includes a central portion 81 which is generally square and located at the center, and four circumferential portions 82 which extend from four sides of the central portion 81 each in a generally rectangular shape. That is, in the illustrated embodiment, the vehicle-side panel 80 includes, between adjoining circumferential portions 82, four cut-out portions 83. The central portion 81 is provided with the inlet port 25 and mounting holes 26a. The afore-described vent holes 29 are formed in one of the circumferential portions 82 located in front of the central portion 81.

As can be seen in FIGS. 9B and 10, the driver-side panel 86 is formed into a generally cross-shaped outer contour, and includes a central portion 87 which is generally square and located at the center, and four circumferential portions 88 which extend from four sides of the central portion 87 each in a generally rectangular (or trapezoidal) shape. That is, in the illustrated embodiment, the driver-side panel 86 includes, between adjoining circumferential portions 88, four cut-out portions 89. Leading edges 88a of the four circumferential portions 88 which are located on the sides apart from the central portion 87 form the outer circumferential edge 32a of the driver-side wall 32 in combination. Each of the leading edges 88a is generally identical in outer shape to a leading edge 82a of a corresponding circumferential portion 82 of the vehicle-side panel 80 which is located on the side apart from the central portion 81. Thus, the outer circumferential edge 32a of the driver-side wall 32 is identical in outer shape to the outer circumferential edge 23a of the vehicle-side wall 23.

In the illustrated embodiment, the driver-side panel 86 and vehicle-side panel 80 as laid flat have generally same widths in a front and rear direction and in a left and right direction, but differ in shape of the cut-out portions 83, 89, as can be seen in FIG. 10. In the driver-side panel 86, side edges 88b of each of the circumferential portions 88, i.e. side edges 88b each of which forms a half periphery of a cut-out portion 89, curve towards the root portion of the circumferential portion 88, i.e. towards the central portion 87, in such a manner as to draw close to each other, Thus, the central portion 87 has a slightly smaller width than each of the circumferential portions 88. This configuration forms the driver-side wall 32, which is formed by joining together four pairs of the side edges 88b of the circumferential portions 88 to close the cut-out portions 89 and form the taken-in portions 46, in such a generally box shape that has a gentle curve from the upper circumferential wall 45 to the top panel portion 33 and that the taken-in portions (tucks) 46 extend into the top panel portion 33, as can be seen in FIGS. 6 and 7. In comparison, the vehicle-side panel 80 is configured such that a width of the central portion 81 is greater than a length of each of the circumferential portions 82 and such that each of the circumferential portions 82 is generally a flat rectangle. With this configuration, the vehicle-side wall 23, which is formed by joining together four pairs of the side edges 82b of the circumferential portions 82 to close the cut-out portions 83 and form the taken-in portions (tucks) 30, is formed into a flat box shape in which the bottom wall 24 is great and a height of the lower circumferential wall 28 from the bottom wall 24 is small. That is, in this specific embodiment, each of the taken-in portions (tucks) 30 formed in the vehicle-side wall 23 is smaller in length than each of the taken-in portions (tucks) 46 formed in the driver-side wall 32. In the airbag 20 of the illustrated embodiment, reinforcing cloths 95, 96, 97 are applied to the taken-in portions 30, 46 and a periphery of the vent holes 29, as can be seen in FIGS. 9A, 9B and 10.

The base cloths forming the bag body 21; the driver-side panel 86, the vehicle-side panel 80, the base member 92 for forming the redirecting cloth 72, the driver-side sections 60, 64 and vehicle-side section 68 for forming the center tether 50 and outer tether 53, and reinforcing cloths 95, 96, 97, are made of flexible woven fabric of polyester yarns, polyamide yarns or the like.

Production of the airbag 20 of the illustrated embodiment is now described. Firstly, the reinforcing cloth 95, the central portion 92a of the base member 92 of the redirecting cloth 72 and the vehicle-side section 68 of the center tether 50 and outer tether 53 are placed on predetermined positions of the vehicle-side panel 80, and sewn thereto with sewing threads. Then the inlet port 25, mounting holes 26a and vent holes 29 are punched out. The four pairs of adjoining side edges 82b of the circumferential portions 82 of the vehicle-side panel 80 are sewn together with sewing threads, together with the reinforcing cloths 96, thus the taken-in portions (tucks) 30 are formed as well as the vehicle-side wall 23. Subsequently, the driver-side section 64 of the outer tether 53 and driver-side section 60 of the center tether 50 are placed on the central portion 87 of the driver-side panel 86 such that the centers of the joint portions 65 and 61 are matched, and each of them is sewn to the central portion 87 by the outer circumferential edge 61a/65a with sewing threads to form the seams 41 and 42. Thereafter, the taken-in portions (tucks) 46 are formed in the driver-side panel 86 by sewing adjoining side edges 88b of the circumferential portions 88 together with the reinforcing cloths 97, with sewing threads. Thus the driver-side wall 32 is formed. Subsequently, the vehicle-side wall 23 and driver-side wall 32 are sewn together with a seam 47 by the outer circumferential edges 23a, 32a with the outer surfaces facing one another. Thus the bag body 21 is formed into a bag shape. Thereafter, the bag body 21 is reversed inside out via the inlet port 25, the tether-forming portions 62, 66, 70 are taken out from the inlet port 25 and corresponding leading ends 62a, 66a, 70a of those are joined together, thus forming the outer tethers 53 and center tethers 50. The redirecting cloth 72 is formed by joining the edges of the left portion 92b and right portion 92c of the base member 92. The airbag 20 is thus completed.

Folding of the airbag 20 is now described. In advance of the folding, the retainer 10 is placed inside the airbag 20 such that the not-shown bolts of the retainer 10 protrude from the mounting holes 26a. In the illustrated embodiment, the airbag 20 in that state is folded up into a complete folded form 125 through a preparatory folding step that forms the airbag 20 into a later-described preparatory folded form 100, a front-rear contracting step that reduces a width of the preparatory folded form 100 in the front and rear direction, and a left-right contracting step that reduces the width of the preparatory folded form 100 in the left and right direction.

In the preparatory folding step, the airbag 20 is folded into the preparatory folded form 100 as depicted in FIGS. 11A to 13. In the illustrated embodiment, the preparatory folded form 100 has such a form that a lower-surface portion 101, which is composed of the peripheral region of the inlet port 25 in the bottom wall 24 serving as the untaken-in area (i.e. the bottom wall 24) in the vehicle-side wall 23, and an upper-surface portion 102, which is composed of a central portion (i.e. the top panel portion 33) of the driver-side wall 32, are each developed generally flatly while a portion disposed between the upper-surface portion 102 and lower-surface portion 101 including the lower circumferential wall 28 serving as the taken-in area, that is, portions of the vehicle-side wall 23 and driver-side wall 32 disposed towards the outer circumferential edges 23a, 32a (in other words, portions of the lower circumferential wall 28 and upper circumferential wall 45 where the taken-in portions 30, 46 are disposed), is invaginated or folded inward (i.e. towards the inlet port 25) generally flatly between the lower-surface portion 101 and upper-surface portion 102. To describe more specifically, in the preparatory folded form 100, the upper-surface portion 102 and lower-surface portion 101 are disposed such that the center of the driver-side wall 32 (i.e. the center of the joint portion 61 of the center tether 50) and the center of the vehicle-side wall 23 (i.e. the center of the inlet port 25) are generally matched. The preparatory folded form 100 has two main invaginated portions 104 on the left and right sides of the inlet port 25, and two sub-invaginated portions 105 in front and at the rear of the inlet port 25. The sub-invaginated portions 105 have a smaller invaginated amount than the main invaginated portions 104. The main invaginated portions 104 are disposed over a generally entire area in the front and rear direction of the preparatory folded form 100, on the left and right sides of the inlet port 25. In the preparatory folded form 100 of the airbag 20 of the illustrated embodiment, each of the sub-invaginated portions 105 is located between the main invaginated portion 104 and upper-surface portion 102, though not depicted in the drawings exactly.

Figure 11A:
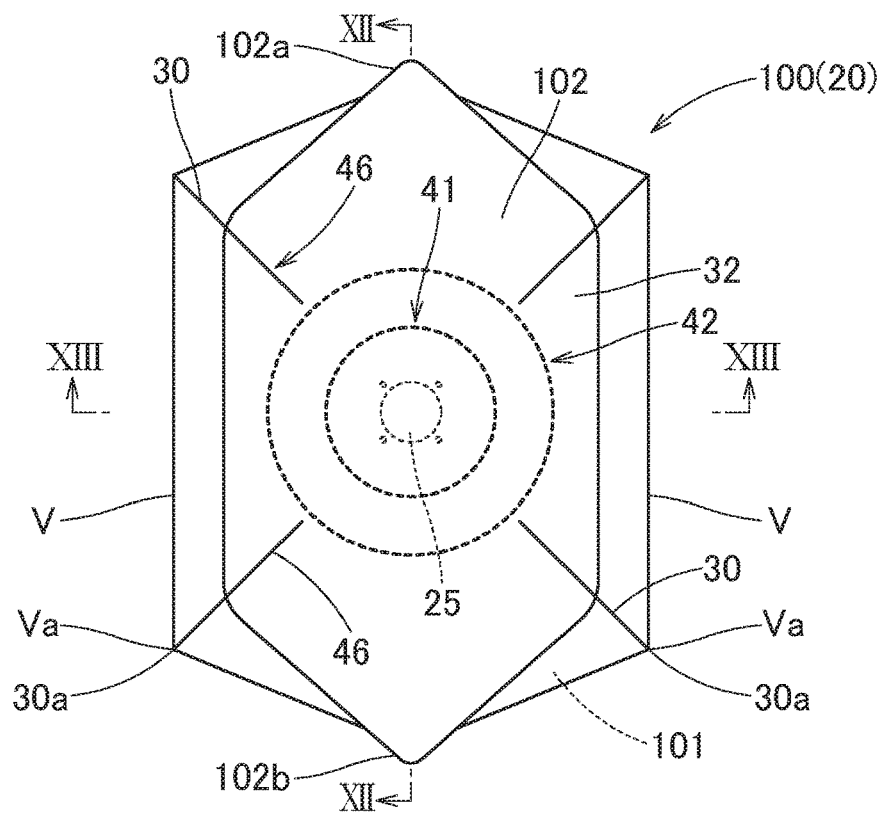
FIG. 11A is a schematic plan view of a preparatory folded form of the airbag in accordance with the exemplary embodiment.
Figure 11B:
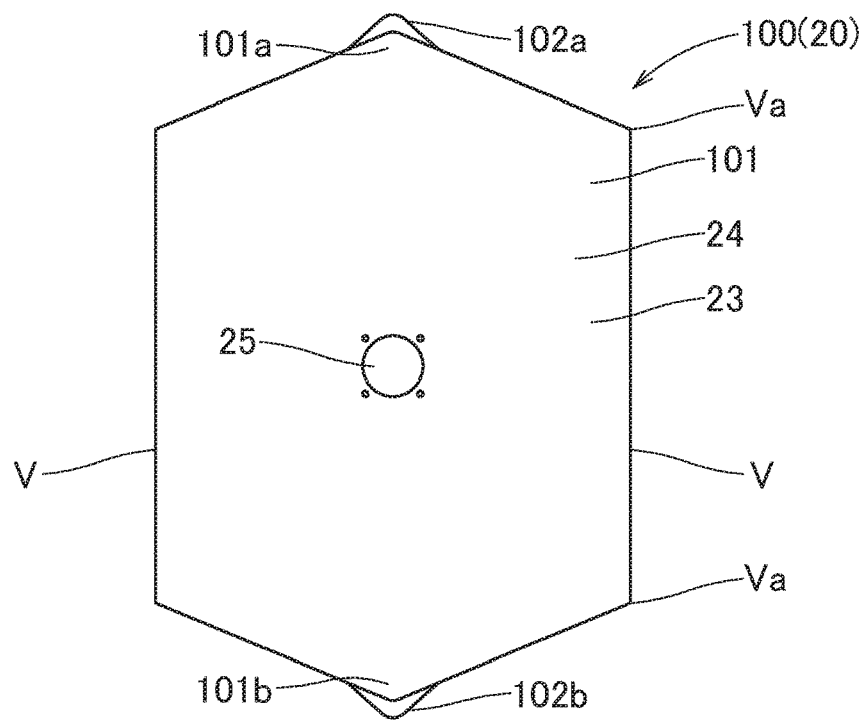
FIG. 11B is a schematic bottom view of the preparatory folded form of the airbag in accordance with the exemplary embodiment.
Figure 12:
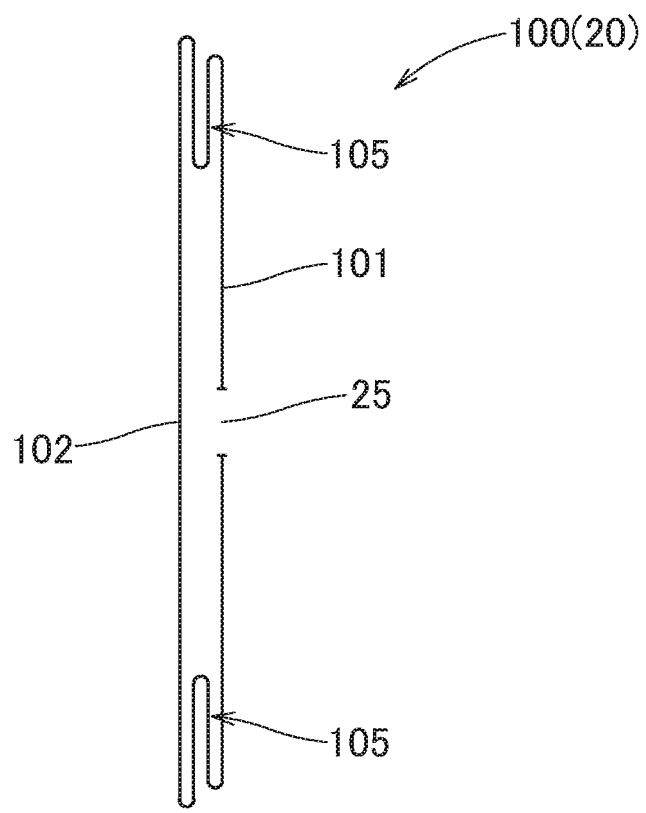
FIG. 12 is a sectional view of the preparatory folded form taken along line XII-XII of FIG. 11A.
Figure 13:
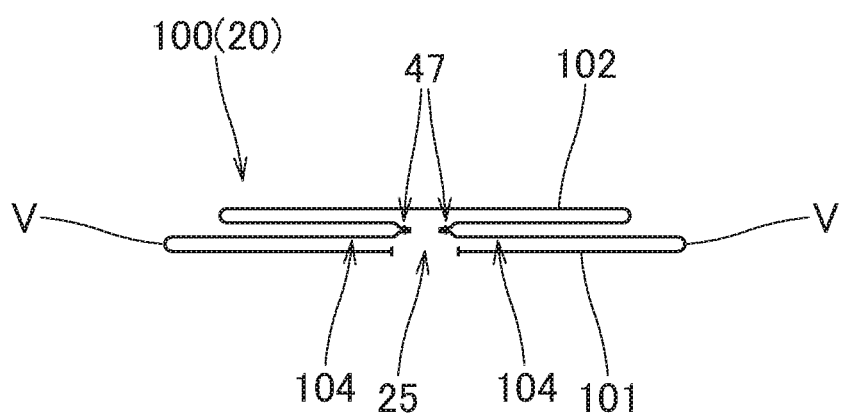
FIG. 13 is a sectional view of the preparatory folded form taken along line XIII-XIII of FIG. 11A.

As can be seen in FIGS. 11A and 11B, each of the upper-surface portion 102 and lower-surface portion 101 has a generally hexagonal shape. In the illustrated embodiment, the lower-surface portion 101 is configured such that the width in the front and rear direction is greater than that in the left and right direction, and the upper-surface portion 102 is configured such that the width in the front and rear direction is slightly greater than that of the lower-surface portion 101 and the width in the left and right direction is smaller than that of the lower-surface portion 101. That is, the upper-surface portion 102 is configured such that the width in the front and rear direction is greater than that in the left and right direction. As can be seen in FIGS. 11A and 11B, the front end 102a of the upper-surface portion 102 protrudes farther forward than the front end 101a of the lower-surface portion 101. In the illustrated embodiment, the rear end 102b of the upper-surface portion 102 also protrudes farther rearward than the rear end 101b of the lower-surface portion 101. As can be seen in FIG. 13, each of the main invaginated portions 104 which are disposed on the left and right sides of the inlet port 25 between the upper-surface portion 102 and lower-surface portion 101 is formed such that the seam 47 of the outer circumferential edges 23a, 32a of the vehicle-side wall 23 and driver-side wall 32 form a bottom or leading end of the invaginated portion 104, in the illustrated embodiment. Moreover, as shown in FIGS. 11A and 11B, each of the main invaginated portions 104 is formed such that opposite terminals Va of a crease V for forming the main invaginated portion 104, which forms a boundary between the lower-surface portion 101 and main invaginated portion 104, generally coincide with terminals 30a of the taken-in portions (or tucks) 30. That is, in the preparatory folded form 100 of the illustrated embodiment, the taken-in portions 30 are not disposed within an area of the lower-surface portion 101, as can be seen in FIG. 11B. The taken-in portions 46 are disposed in an area of the upper-surface portion 102. The preparatory folded form 100 configured as described above can be formed by holding the front end portion and rear end portion of the boundary (i.e. seam 47) between the driver-side wall 23 and vehicle-side wall 23 of the airbag 20, pulling the airbag 20 towards the front and rear, invaginating left and right portions of the inlet port 25 in between the upper-surface portion 102 and lower-surface portion 101 with the seam 47 in the lead so as to form the main invaginated portions 104, then forming the sub-invaginated portions 105 in between the upper-surface portion 102 and lower-surface portion 101. The preparatory folded form 100 is generally bilaterally and anteroposteriorly symmetrical, as shown in FIGS. 11A and 11B.

Figure 15:
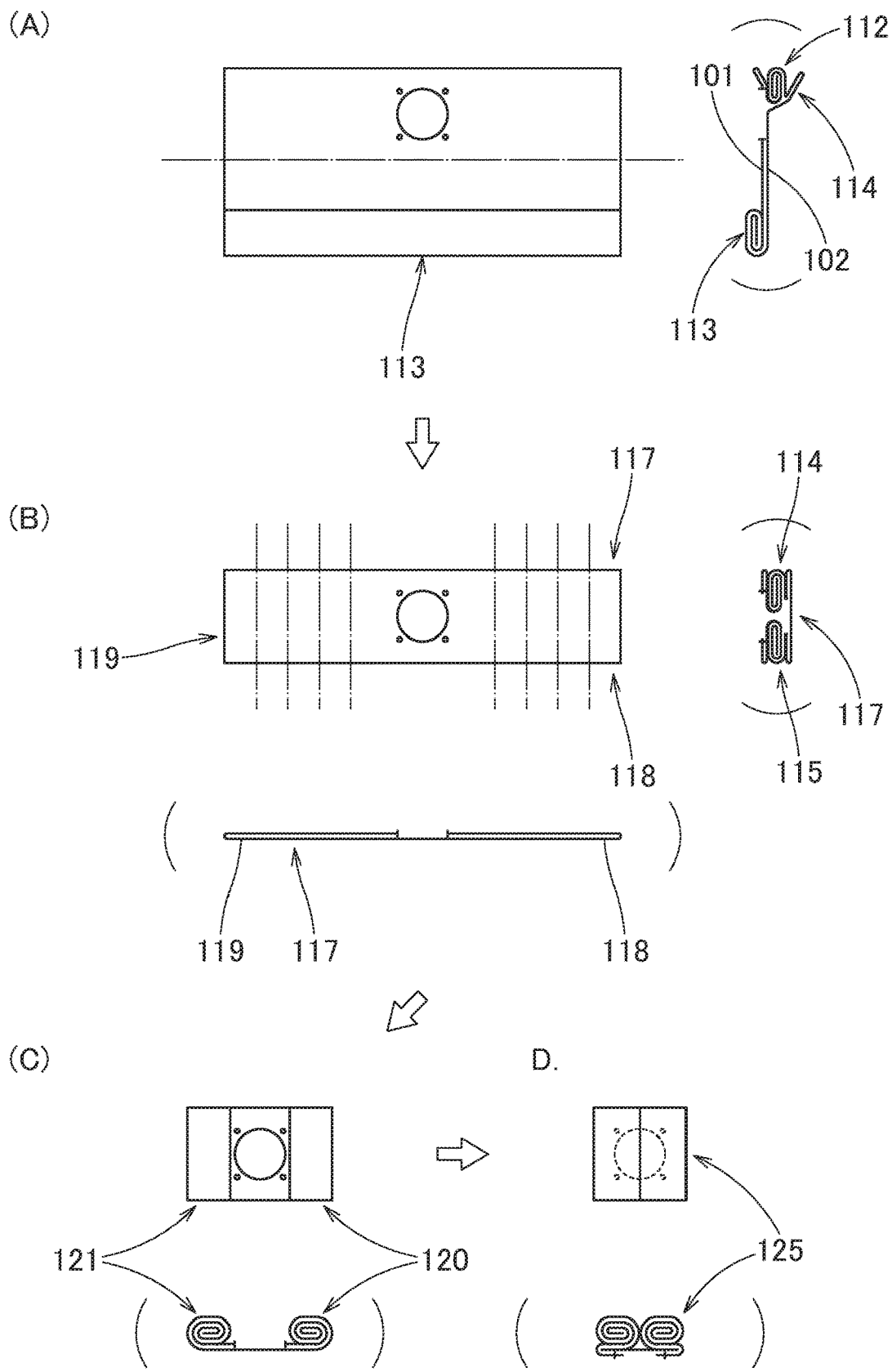

The airbag 20 in the preparatory folded form 100 is then subjected to the front-rear contracting step that reduces the width in the front and rear direction of the preparatory folded form 100. Firstly, as shown in FIG. 14, a front potion 110 of the preparatory folded form 100, which is disposed farther forward than the inlet port 25, and a rear portion 111 which is disposed farther rearward than the inlet port 25 are each rolled on the vehicle-side wall 23 (i.e. on the lower-surface portion 101) from the leading ends, in such a manner as to form creases extending in the left and right direction, thus forming a rolled portion 112 and a rolled portion 113. Then as shown in (A) and (B) of FIG. 15, each of the rolled portions 112, 113 is invaginated in between the upper-surface portion 102 and lower surface portion 101, and placed immediately above the inlet port 25. Thus, a front folded portion 114 and a rear folded portion 115 are formed, and the airbag 20 is formed into a front-rear contracted form 117 whose width in the front and rear direction fits the case 12. Subsequently, the airbag 20 in the front-rear contracted form 117 is subjected to the left-right contracting step. As shown in (B) and (C) of FIG. 15, a left portion 118 of the front-rear contracted form 117, which is disposed on the left side of the inlet port 25, and a right portion 119 disposed on the right side of the inlet port 25 are each rolled on the vehicle-side wall 23 in such a manner as to form creases extending in the front and rear direction, thus forming a rolled portion 120 and a rolled portion 121. Then the rolled portions 120, 121 are placed on the inlet port 25, as shown in (D) of FIG. 15. Now the folding of the airbag 20 is completed, and the airbag 20 has a complete folded form 125.

Thereafter, the airbag 20 in the complete folded form 125 is bound by a not-shown wrapping member for keeping the folded-up configuration, and is stored in the case 12. Then the inflator body 11a is inserted into the case 12 from below the bottom wall 12a such that the bolts of the retainer 10 penetrate the flange 11c of the inflator 11, and the bolts are fastened with nuts. The inflator 11 and airbag 20 are thus mounted on the case 12. Then the airbag cover 14 is placed over the case 12 and secured to the case 12 with rivets 15 or the like. If then the horn switch mechanism 13 is attached to the mounting tongues 12c of the case 12, the airbag device M is finished. The airbag device M is mounted on the steering wheel body 1 which has been fastened to the steering shaft SS through the use of the mounting base 13a of the horn switch mechanism 13. Thus the airbag device M is mounted on the vehicle.

When the airbag device M is actuated, the inflator 11 feeds an inflation gas G to the airbag 20 (i.e. bag body 21) via the gas discharge ports 11b, the bag body 21 is then inflated, pushes and opens the doors 14b of the airbag cover 14, protrudes from the case 12 and covers the upper surface of the steering wheel W generally all over, as can be seen in FIG. 1 (with dashed-and-double-dotted lines) and FIGS. 2 and 3.

Although the vehicle-side wall 23 of the airbag 20 is formed into a three-dimensional shape by having more than one taken-in portions (tucks) 30 in the vicinity of the outer circumferential edge 23a, in the preparatory folded form 100 of the airbag 20, the invaginated portions 104 and 105 are disposed in between the upper-surface portion 102 which is composed of a central portion of the driver-side wall 32 and the lower-surface portion 101 which is composed of the peripheral portion of the inlet port 25 in the untaken-in area (i.e. the bottom wall 24) of the vehicle-side wall 23, in which no taken-in portions (tucks) 30 are disposed, by partially invaginating the portion of the airbag 20 including the taken-in area which is provided with the taken-in portions (tucks) 30 (i.e. the lower circumferential wall 28). That is, although the airbag 20 includes the vehicle-side wall 23 having a three-dimensional shape, the airbag 20 can be formed into the flat preparatory folded form 100 in which the invaginated portions 104, 105 are disposed between the upper-surface portion 102 and lower-surface portion 101. This will facilitate the subsequent folding work, the airbag 20 will be folded smoothly. In the preparatory folded form 100 of the airbag 20, moreover, the central portion of the driver-side wall 32, i.e. the upper-surface portion 102, is laid over the vehicle-side wall 23 (i.e. the lower-surface portion 101), on the inlet port 25. This configuration will help push out the center of the driver-side wall 32 towards the driver and unfold the driver-side wall 32 quickly in an initial stage of airbag deployment, thus protect the driver quickly.

Therefore, the preparatory folded form 100 of the airbag 20 in accordance with the exemplary embodiment is easy to fold for storage in the case 12 (i.e. the storage) despite of a three-dimensional shape of the vehicle-side wall 23.

In the airbag 20, the driver-side wall 32 is, in addition to the vehicle-side wall 23, formed into a three-dimensional shape by having the taken-in portions (tucks) 46. The airbag 20 can still be formed into the flat preparatory folded form 100 as described above. Since the preparatory folded form 100 is subjected to the folding for reducing the widths of the airbag 20 in the front-rear and left-right directions, the flat preparatory folded form 100 is easy to fold, the airbag 20 will thus be folded smoothly. The driver-side wall may be configured without any taken-in portions. By way of example, the driver-side wall may be composed of a base cloth having a generally round shape.

In the airbag 20 in the foregoing embodiment, the bag body 21 is designed to be inflatable into such a generally pot-like shape that is bulky in height or thickness, by having the taken-in portions (or tucks) 30, 46 in the outer circumferential edges 23a, 32a of the vehicle-side wall 23 and driver-side wall 32. Moreover, the airbag 20 includes the central protruding portion 35, the circumferential protruding portion 36, and the small protruding portion 37 in the top panel portion 33 of the driver-side wall 32. With this configuration, in the event of an oblique collision or an offset collision of the vehicle in which the head H of a driver MD moves diagonally forward, the airbag 20 will be able to receive the head H in an area around the small protruding portion 37 which is relatively sunken between the central protruding portion 35 and circumferential protruding portion 36 smoothly, then restrain the head H with the circumferential protruding portion 36 which bulges greatly, as indicated by dashed-and-double-dotted lines in FIG. 3.

As can be seen in FIGS. 11A and 11B, the preparatory folded form 100 of the airbag 20 is configured such that each of the opposite terminals Va of the crease V for forming the main invaginated portion 104, which crease forms a boundary between the lower-surface portion 101 and main invaginated portion 104, generally coincides in position with the terminal 30a of one of the taken-in portions (or tucks) 30. That is, in the preparatory folded form 100 of the illustrated embodiment, the taken-in portions (tucks) 30 do not go into the area of the lower-surface portion 101. With this configuration, since each of the creases V for forming the main invaginated portions 104 does not intersect with the taken-in portion (tuck) 30, the main invaginated portions 104 are prevented from becoming bulky, which contributes to size reduction of the airbag 20 as completely folded. If such an advantageous effect does not have to be considered, the creases for forming the invaginated portions may be configured to intersect with the taken-in portions (tucks) and go into the lower-surface portion of the preparatory folded form.

In the preparatory folded form 100 of the airbag 20 in the foregoing embodiment, the upper-surface portion 102 is configured such that the width in the front and rear direction is greater than that in the left and right direction. This configuration will help develop the airbag 20 widely in the front and rear direction quickly in the initial stage of airbag deployment for protecting a front surface of an upper body of the driver as well as deploy the airbag in a narrow space between the steering wheel W and the abdomen of the driver quickly. If such advantageous effects do not have to be considered, the upper-surface portion may be configured such that the width in the front and rear direction is smaller than the width in the left and right direction, or generally identical to the width in the left and right direction.

Furthermore, in the preparatory folded form 100 of the airbag 20 in the foregoing embodiment, the upper-surface portion 102 is configured such that the front end 102a protrudes farther forward than the front end 101a of the lower-surface portion 101. This configuration will expedite a forward deployment of the front end 102a of the upper-surface portion 102 (i.e. the driver-side wall 32) and prevent the front end 102a of the upper-surface portion 102 from contacting the chin of the driver (in other words, from going into a space under the chin) in the initial stage of airbag deployment, especially when the driver is located in proximity to the steering wheel W. If such an advantageous effect does not have to be considered, the preparatory folded form may be configured such that the front end of the upper-surface portion substantially matches the front end of the lower-surface portion or is located father rearward than the front end of the lower-surface portion.

Figure 16:
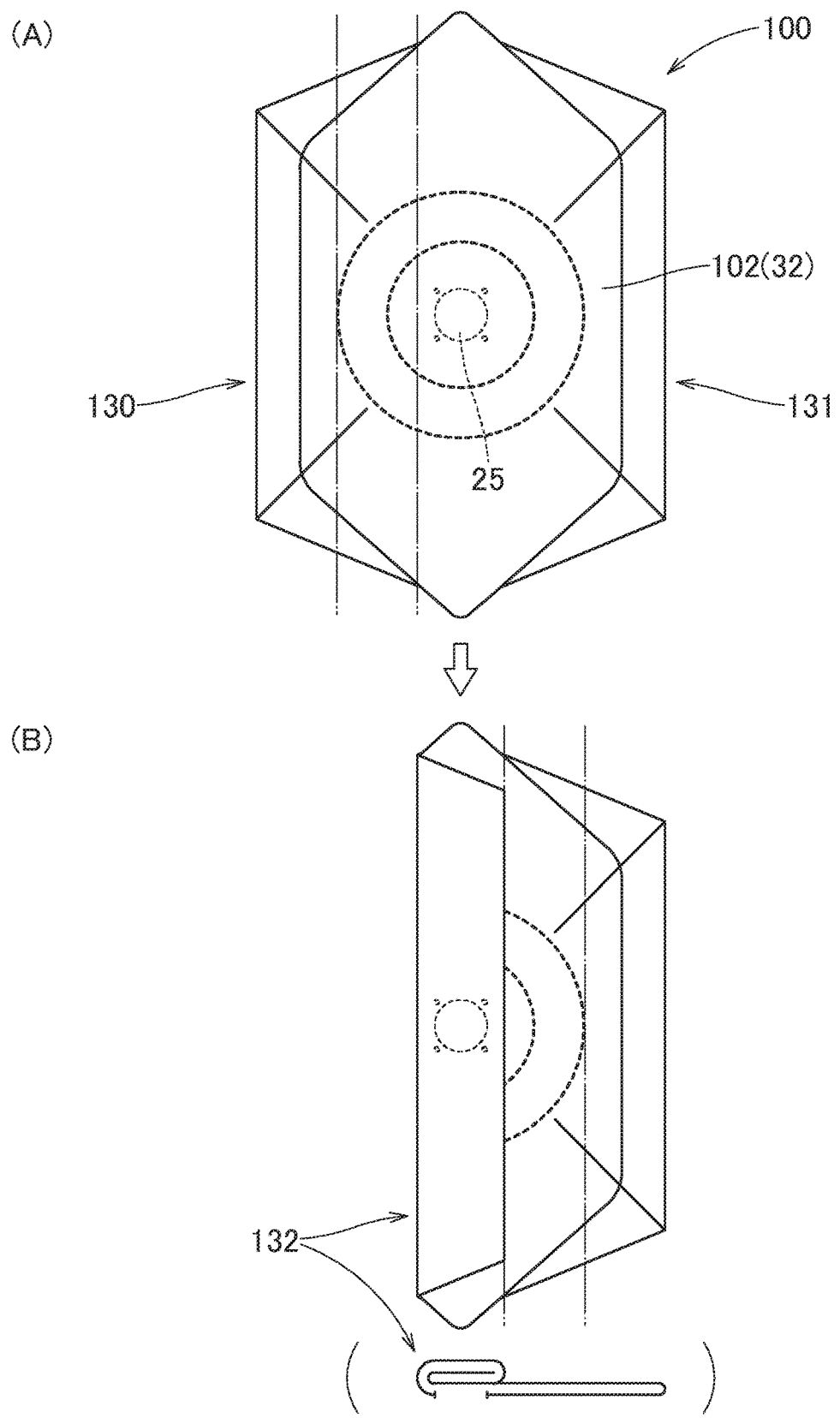
Figure 18:
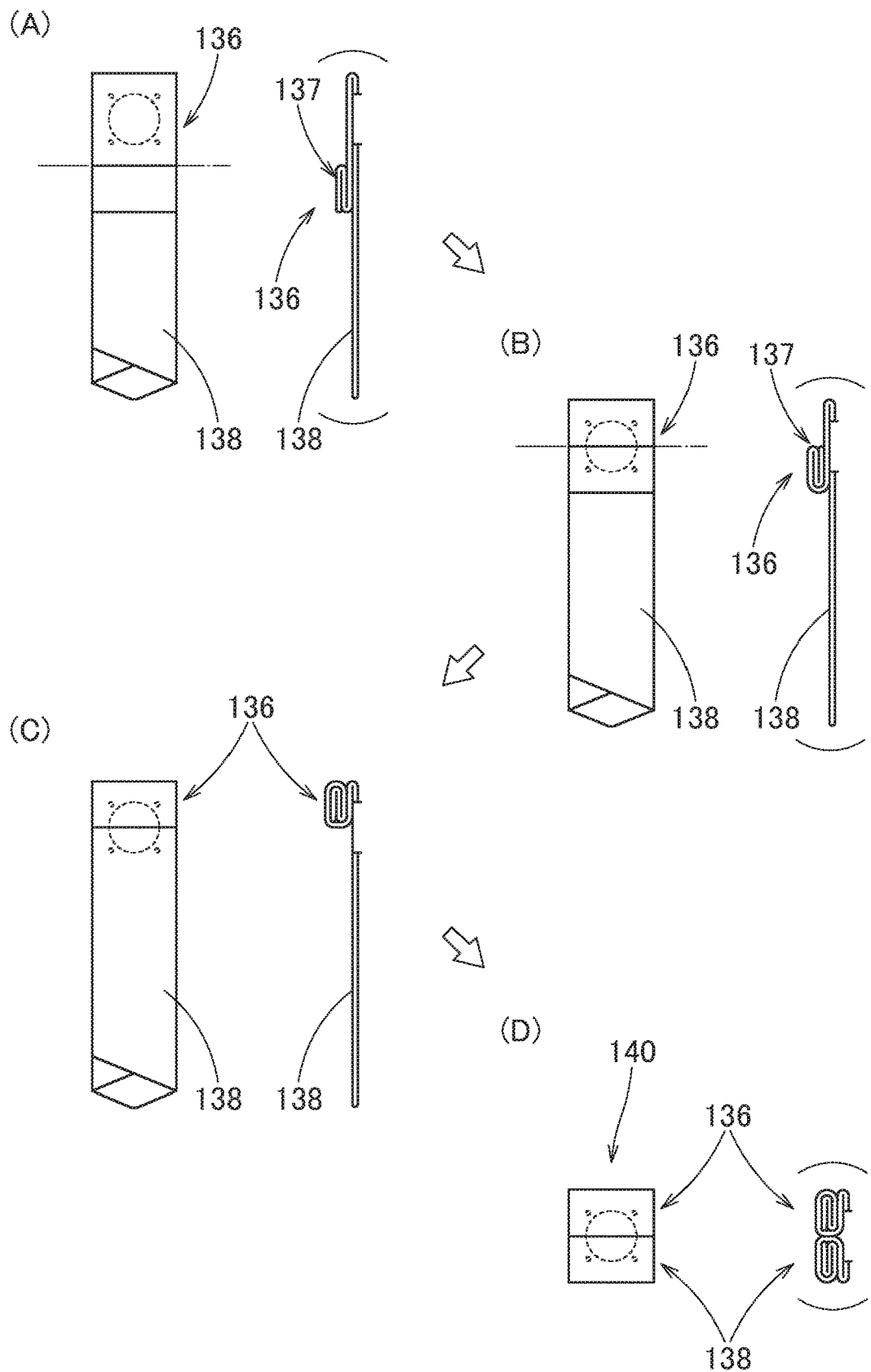

Although the airbag 20 in the foregoing embodiment as formed into the preparatory folded form 100 is subsequently subjected to the front-rear contracting step first, then to the left-right contracting step, the folding process of the airbag 20 should not be limited thereby. As depicted in FIGS. 16 to 18, by way of example, the airbag 20 in the preparatory folded form 100 may be subjected to a left-right contracting folding first, then to a front-rear contracting folding. To describe more particularly referring to FIG. 16 and (A) of FIG. 17 first, in this alternative folding method, a left portion 130 of the preparatory folded form 100 which is disposed on the left side of the inlet port 25, and a right portion 131 which is disposed on the right side of the inlet port 25 are each rolled on the driver-side wall 32 (i.e. on the upper-surface portion 102) from the leading ends, in such a manner as to form creases extending in the front and rear direction, thus forming a rolled portion 132 and a rolled portion 133. The rolled portions 132 and 133 are placed on the inlet port 25. Now the airbag 20 has a left-right contracted form 135. Subsequently, as shown in (B) of FIG. 17 and (A) of FIG. 18, a front portion 136 of the left-right contracted form 135, which is disposed in front of the inlet port 25, is folded in a concertina fashion on more than one creases extending in the left and right direction, thus providing a concertina-folded portion 137. Then the concertina-folded portion 137 is turned and placed in a region in front of the inlet port 25, as can be seen in (B) and (C) of FIG. 18. If a rear portion 138 of the left-right contracted form 135, which is disposed at the rear of the inlet port 25, is folded likewise, the airbag 20 is formed into a complete folded form 140 as can be seen in (D) of FIG. 18.

Figure 21:
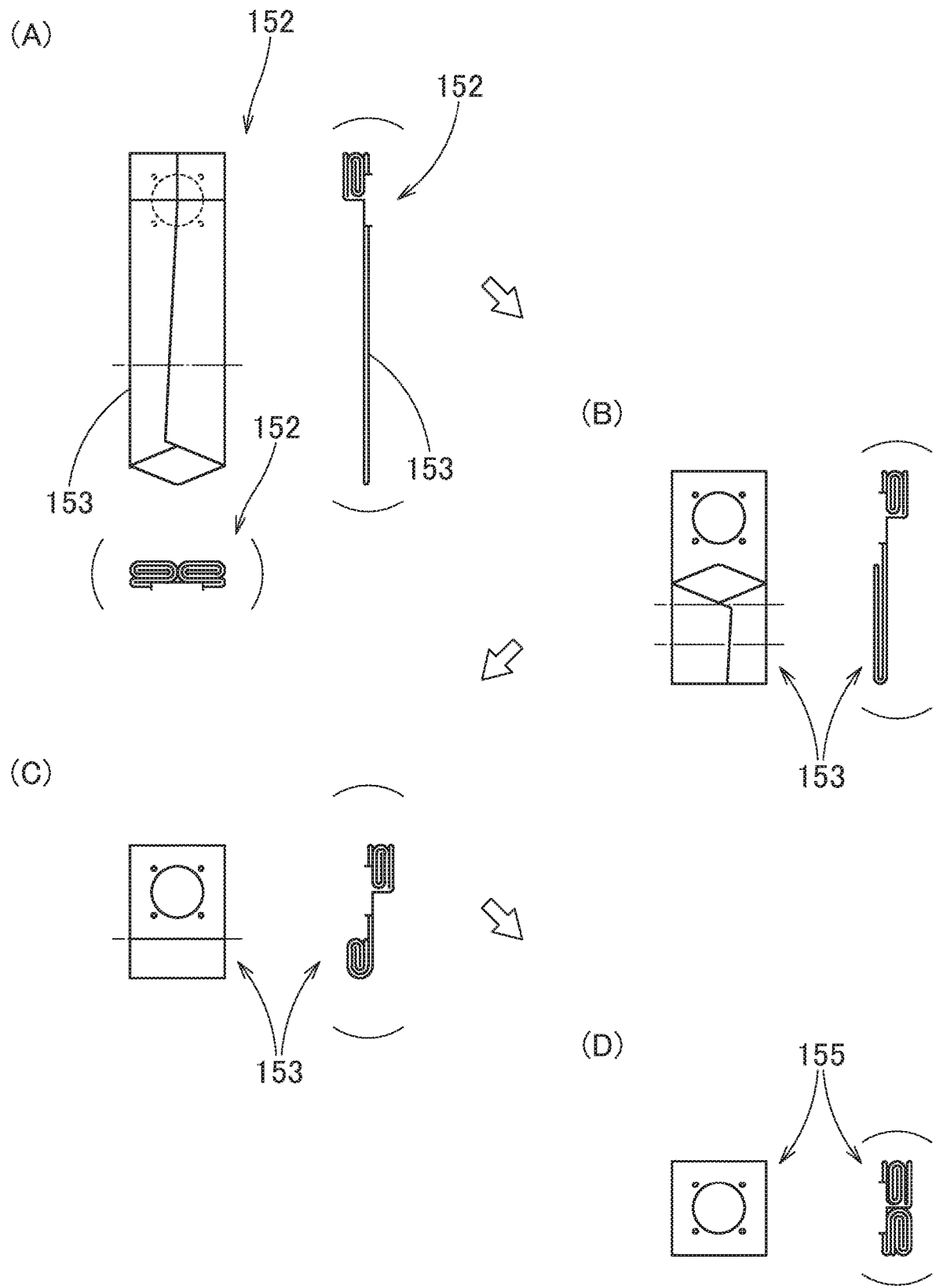

Further alternatively, the airbag 20 in the preparatory folded form 100 may be folded in accordance with a folding method depicted in FIGS. 19 to 21. In this folding method, as shown in FIG. 19, a front potion 142 of the preparatory folded form 100, which is disposed in front of the inlet port 25, is rolled on the vehicle-side wall 23 (i.e. on the lower-surface portion 101) from the leading end on creases extending in the left and right direction, thus forming a rolled portion 143. Then as shown in (A) of FIG. 20, the rolled portion 143 is invaginated in between the upper-surface portion 102 and lower surface portion 101, and placed immediately above the inlet port 25, which provides a front folded portion 144. Now the airbag 20 has a partial front-rear contracted form 146. Subsequently, as shown in (B) of FIG. 20 and (A) of FIG. 21, a left portion 147 of the partial front-rear contracted form 146, which is disposed on the left side of the inlet port 25, and a right portion 148 disposed on the right side of the inlet port 25 are each rolled on the vehicle-side wall 23 from the leading ends on creases extending in the front and rear direction, thus forming a rolled portion 149 and a rolled portion 150. Then the rolled portions 149, 150 are placed on the inlet port 25, as shown in (B) of FIG. 20 and (A) of FIG. 21. Now the airbag 20 has a left-right contracted form 152. Thereafter, a rear portion 153 of the left-right contracted form 152, which is disposed at the rear of the inlet port 25, is doubled first as shown in (B) of FIG. 21, rolled on creases extending in the left and right direction as shown in (C) of FIG. 21, then placed on the inlet port 25. Now the folding of the airbag 20 is completed, and the airbag 20 has a complete folded form 155 as shown in (D) of FIG. 21.

The folding method of the preparatory folded form 100 of the airbag 20 should not be limited thereby. The preparatory folded form 100 may also be folded by a radial folding method that gathers up a portion of the preparatory folded form 100 around the inlet port 25 towards the inlet port 25 from the outer circumferential edge in a compressing fashion.

Figure 22:
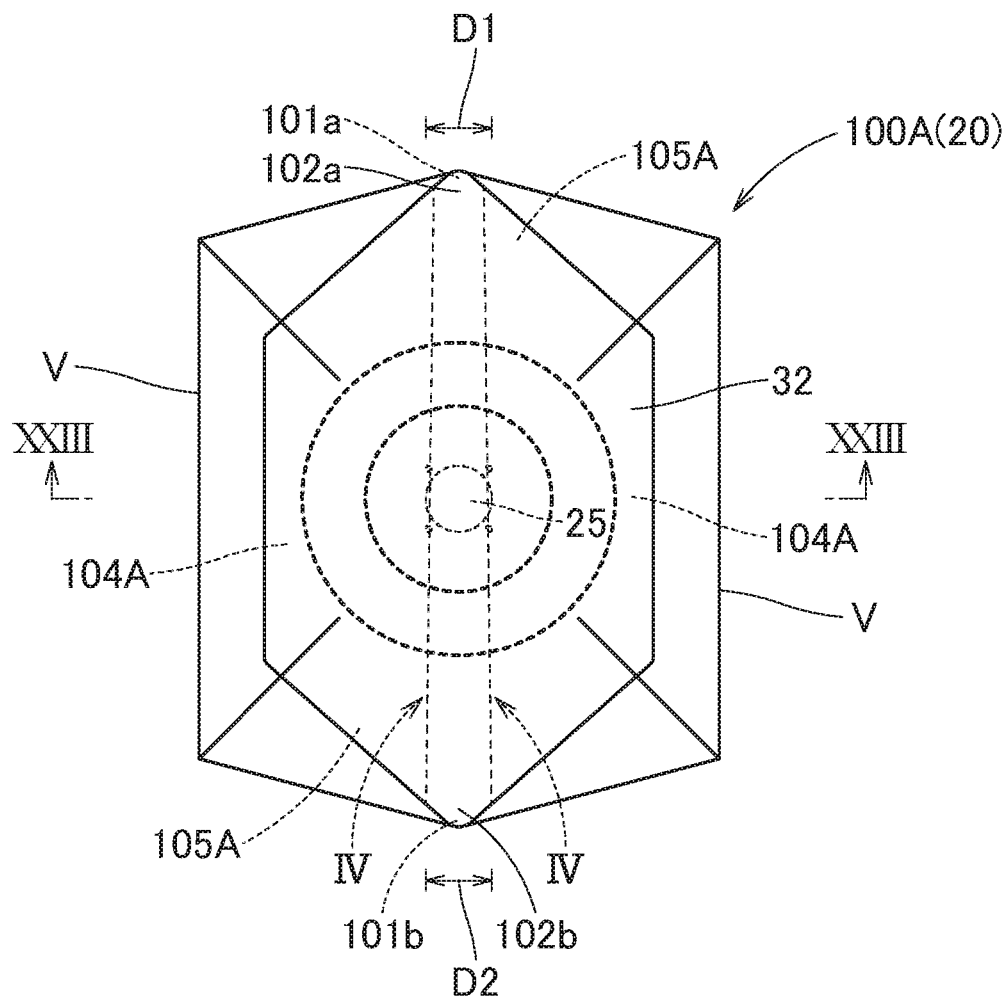
FIG. 22 is a schematic plan view of a modification of the preparatory form of the airbag.
Figure 23:
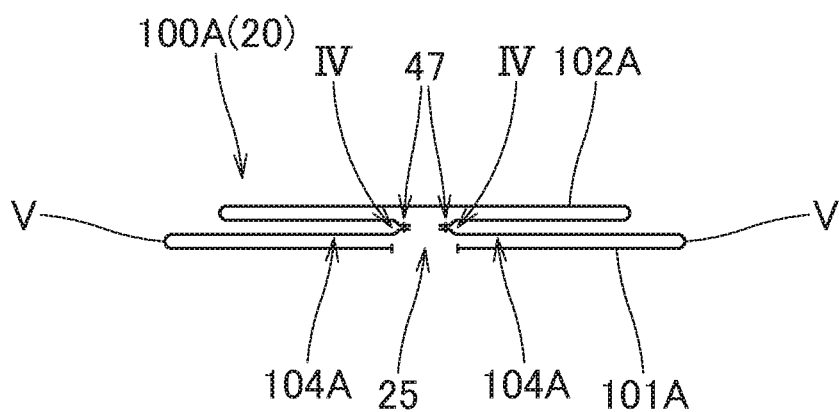
FIG. 23 is a sectional view taken along line XXIII-XXIII of FIG. 22.

The preparatory folded form of the airbag 20 may be configured like a preparatory folded form 100A depicted in FIGS. 22 and 23. The preparatory folded form 100A includes two main invaginated portions 104A and sub-invaginated portions 105A, and has a generally identical outer shape to the preparatory folded form 100 in the foregoing embodiment. The preparatory folded form 100A is different from the preparatory folded form 100 in that the front end 102a and rear end 102b of the upper-surface portion 102A substantially coincide in position with the front end 101a and rear end 101b of the lower-surface portion 101A. Also in the preparatory folded form 100A, the main invaginated portions 104A are disposed over a generally entire area in the front and rear direction of the preparatory folded form 100A, on the left and right sides of the inlet port 25. Inner creases IV that form the leading ends of the main invaginated portions 104A extend generally in the front and rear direction, and configured such that a distance between them increases towards the rear end. In this specific embodiment, as shown in FIG. 22, a distance D1 between the inner creases IV in a front end region of the preparatory folded form 100A is approximately four fifth of a distance D2 between the inner creases IV in a rear end region of the preparatory folded form 100A.

Figure 24:
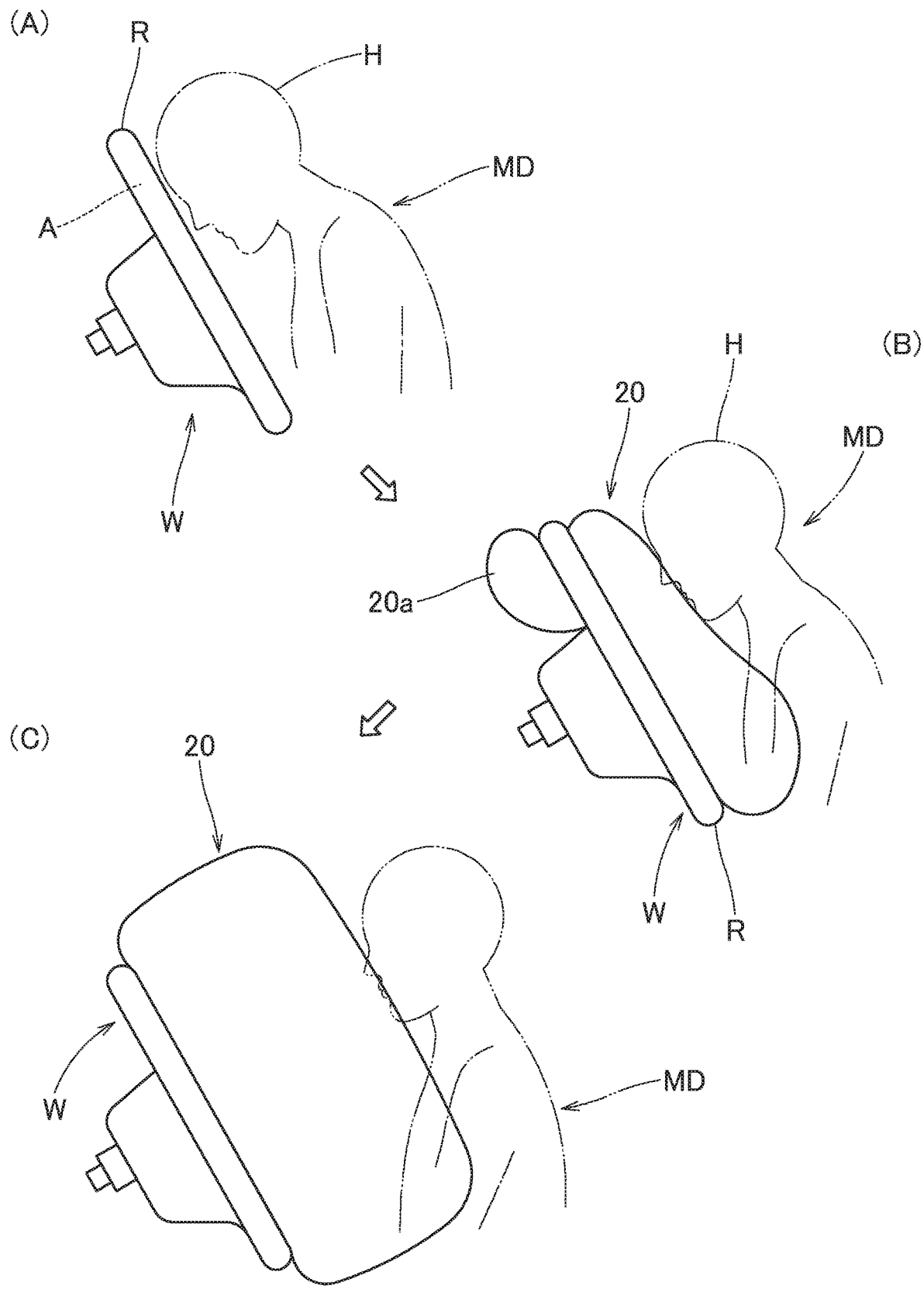
FIG. 24 schematically illustrates the way the airbag as has been folded up from the preparatory folded form of FIG. 22 behaves when deployed.

That is, a space between the inner creases IV narrows towards the front end of the preparatory folded form 100A. With this configuration, in an initial stage of airbag deployment, a smaller amount of inflation gas flows toward the front end 102a of the upper-surface portion 102A than in the rear end 102b region, so that the front end portion of the airbag 20 will be prevented from protruding towards the driver in the initial stage of airbag deployment. As a consequence, when the head H of a driver MD is located proximate to the steering wheel W in the initial stage of airbag deployment as shown in (A) of FIG. 24, by way of example, the front end portion 20a will not protrude towards the driver MD unduly but go into a space A (FIG. 1) between the rim R and boss section B of the steering wheel Was shown in (B) of FIG. 24, then be inflated completely as shown in (C) of FIG. 24. Therefore, the airbag 20 will be deployed without giving an undue pressure to the driver MD when he is located proximate to the steering wheel W.

What is claimed is:

1. A preparatory folded form of an airbag deployable over a steering wheel of a vehicle, the preparatory folded form being a form of the airbag in an initial stage in a folding process of the airbag which has not yet been subjected to further folding steps to reduce a size of the airbag in a front and rear direction and in a left and right direction for storage in a storage location of a steering wheel, the airbag including a driver-side wall which is deployable towards a driver's seat and a vehicle-side wall which is deployable towards the steering wheel, the driver-side wall and vehicle-side wall being joined together by outer circumferential edges thereof, wherein the vehicle-side wall includes: an inlet port for introducing an inflation gas, in a vicinity of a center of the vehicle-side wall; a plurality of taken-in portions that are located towards the outer circumferential edge of the vehicle-side wall for reducing a length of the outer circumferential edge of the vehicle-side wall; an untaken-in area that is disposed in a vicinity of the inlet port and has no taken-in portions; and a taken-in area that is disposed towards the outer circumferential edge of the vehicle-side wall and provided with the taken-in portions, the preparatory folded form of the airbag comprising:

an upper-surface portion that is composed of a central portion of the driver-side wall;

a lower-surface portion that is composed of a portion of the untaken-in area disposed in a periphery of the inlet port; and at least one invaginated portion that is composed of a portion of the airbag located between the upper-surface portion and the lower-surface portion and including the taken-in area, and is invaginated in between the upper-surface portion and the lower-surface portion towards the inlet port, wherein the upper-surface portion, the invaginated portion and the lower-surface portion lie over one another.

2. The preparatory folded form of the airbag of claim 1, wherein each of opposite terminals of a crease which forms a boundary between the invaginated portion and the lower-surface portion generally coincides in position with a terminal of one of the taken-in portions.

3. The preparatory folded form of the airbag of claim 2, wherein the upper-surface portion is configured such that a width thereof in the front and rear direction is greater than that in the left and right direction.

4. The preparatory folded form of the airbag of claim 3, wherein a front end of the upper-surface portion protrudes farther forward than a front end of the lower-surface portion.

5. The preparatory folded form of the airbag of claim 3, wherein:

one each invaginated portion is disposed over a generally entire area in the front and rear direction of the preparatory folded form, on left and right sides of the inlet port;

each of the invaginated portions includes an inner crease that forms a leading end of the invaginated portion; and a distance between the inner creases increases towards a rear end of the preparatory folded form.

6. The preparatory folded form of the airbag of claim 1, wherein the upper-surface portion is configured such that a width thereof in the front and rear direction is greater than that in the left and right direction.

7. The preparatory folded form of the airbag of claim 6, wherein a front end of the upper-surface portion protrudes farther forward than a front end of the lower-surface portion.

8. The preparatory folded form of the airbag of claim 6, wherein:

one each invaginated portion is disposed over a generally entire area in the front and rear direction of the preparatory folded form, on left and right sides of the inlet port;

each of the invaginated portions includes an inner crease that forms a leading end of the invaginated portion; and a distance between the inner creases increases towards a rear end of the preparatory folded form.

\* \* \* \* \*